SORTING SYSTEM FOR MULTIPLE BIT BINARY RECORDS

Filed July 26, 1965 12 Sheets-Sheet 1

INVENTOR
Philip N. Armstrong
By Keith D. Beecher
Attorney

Fig. 3
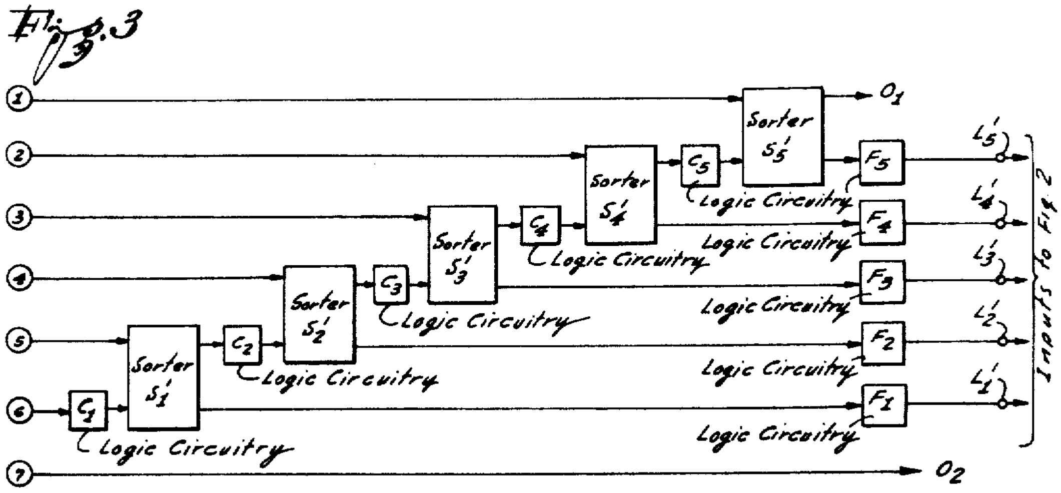
Fig. 4 (Sorter S)
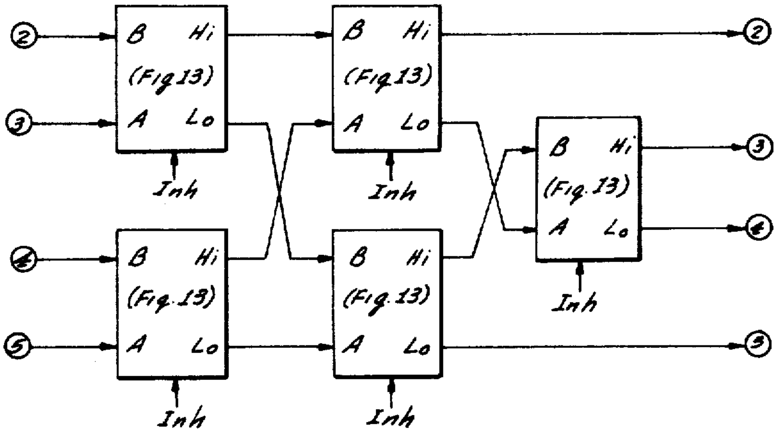
INVENTOR:
Philip N. Armstrong
By Keith D. Beecher
Attorney INVENTOR:
Philip N. Armstrong
By Keith D. Beecher
Attorney Aug. 27, 1968 P. N. ARMSTRONG 3,399,383

SORTING SYSTEM FOR MULTIPLE BIT BINARY RECORDS

Filed July 26, 1965 12 Sheets-Sheet 4

INVENTOR:
Philip N. Armstrong

By Keith D. Beecher
Attorney

SORTING SYSTEM FOR MULTIPLE BIT BINARY RECORDS
Filed July 26, 1965 12 Sheets-Sheet 5
Fig. 9 (Completion of Input Mode)
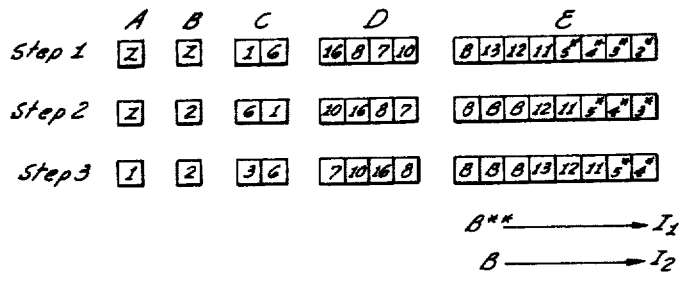
Fig. 10 (Sort Mode—Phase I)
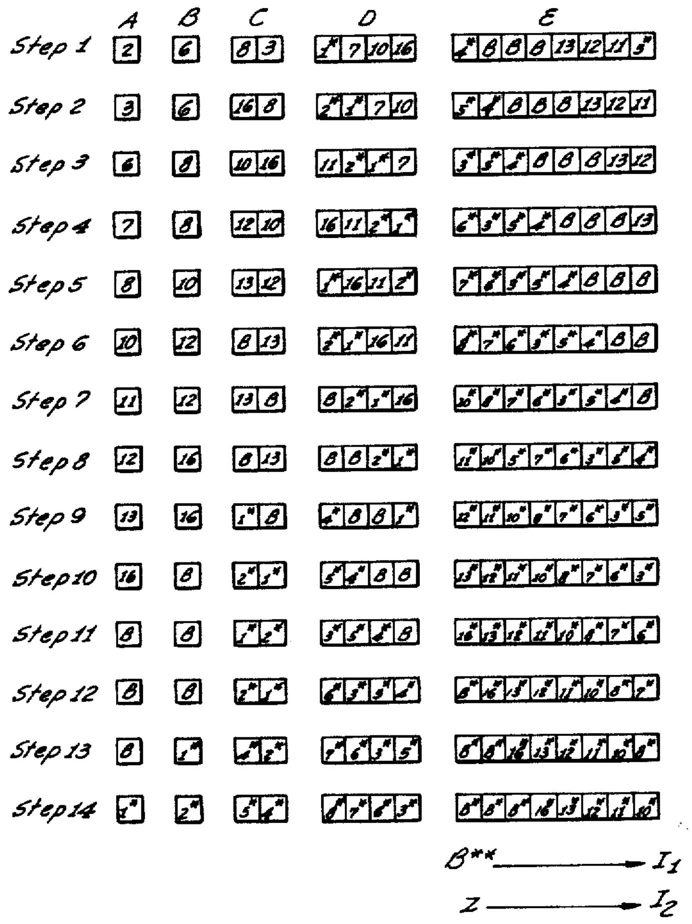
INVENTOR:
Philip N. Armstrong
By Keith D. Beecher
Attorney Aug. 27, 1968 P. N. ARMSTRONG 3,399,383
SORTING SYSTEM FOR MULTIPLE BIT BINARY RECORDS
Filed July 26, 1965 12 Sheets-Sheet 6
Fig. 11 (Sort Mode - Continued)
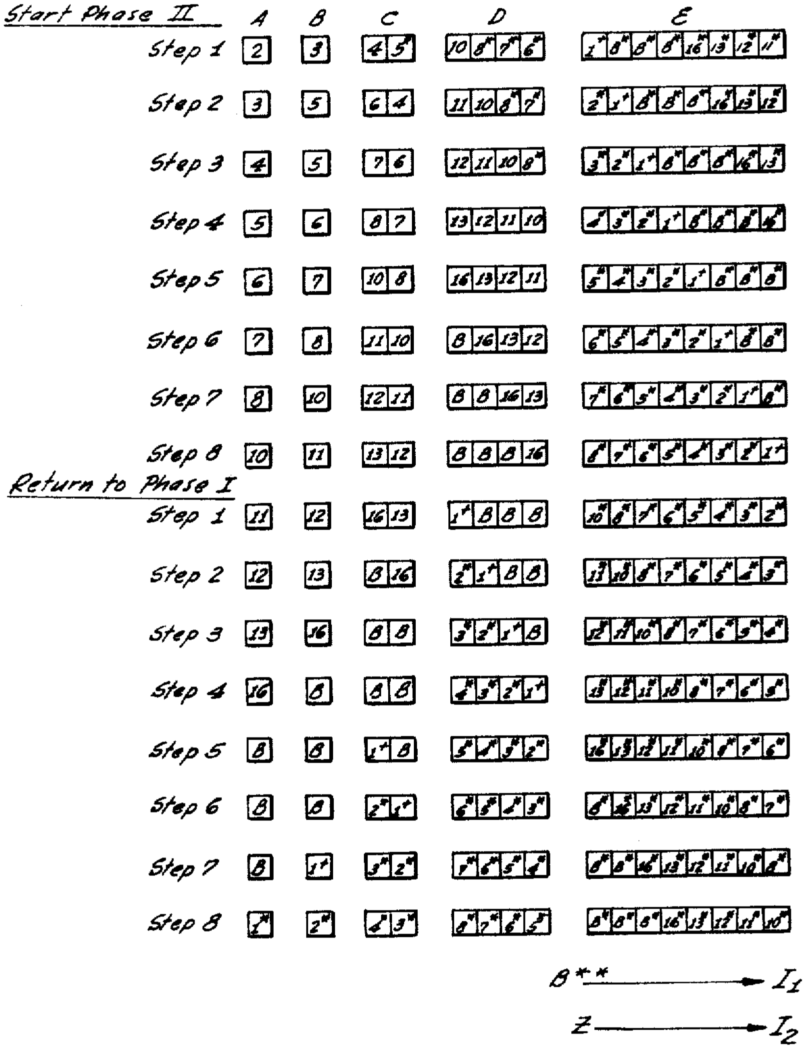
INVENTOR
Philip N. Armstrong
By Keith D. Beecher
Attorney Fig. 12 (Output Mode)
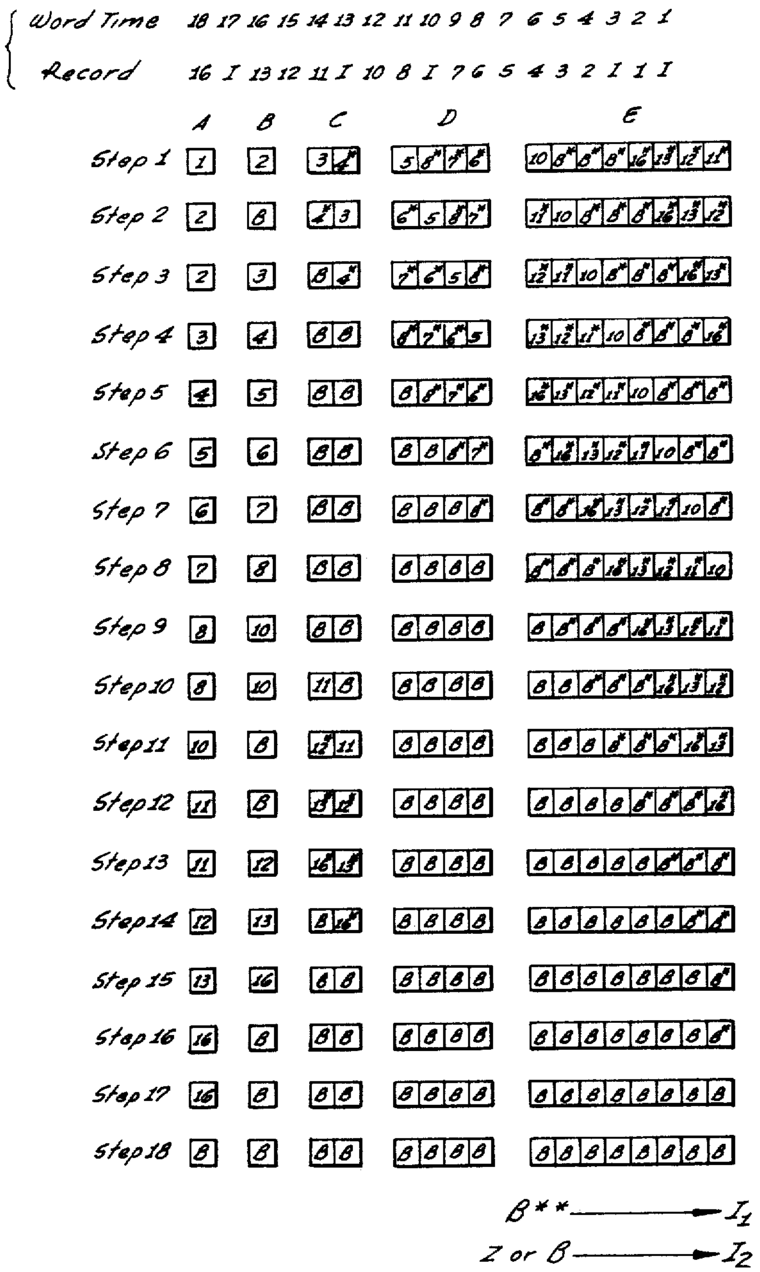
INVENTOR:
Philip N. Armstrong
By Keith D Beecher
Attorney

SORTING SYSTEM FOR MULTIPLE BIT BINARY RECORDS

Filed July 26, 1965 12 Sheets-Sheet 8

Fig. 13 (Sorting Network)

| | $t_3$ | $t_2$ | $t_1$ |
|---|---|---|---|
| B** | 1 | 1 | 1 |
| B* | 1 | 1 | 0 |
| D* | 1 | 1 | 0 |
| B | 0 | 1 | 0 |
| D+ | 0 | 1 | 0 |
| D | 1 | 0 | 0 |
| Z | 0 | 0 | 0 |

INVENTOR:
Philip N. Armstrong
By Keith D. Beecher
Attorney

SORTING SYSTEM FOR MULTIPLE BIT BINARY RECORDS

Filed July 26, 1965

INVENTOR.
Philip N. Armstrong
By Keith D. Beecher
Attorney

INVENTOR:
Philip N. Armstrong
By Keith D Beecher
Attorney

INVENTOR:
Philip N. Armstrong
By Keith D. Beecher
Attorney

INVENTOR:
Philip N. Armstrong
By Keith D. Beecher
Attorney

United States Patent Office 3,399,383
Patented Aug. 27, 1968

3,399,383

SORTING SYSTEM FOR MULTIPLE BIT BINARY RECORDS

Philip N. Armstrong, 17331 Keegan Way, Santa Ana, Calif. 92705

Filed July 26, 1965, Ser. No. 474,723
3 Claims. (Cl. 340—172.5)

ABSTRACT OF THE DISCLOSURE

A sorting system for multi-bit binary records is described in the following specification, and which is capable of responding to a control field in each record in order to sort the records in an ascending or descending progression. The system has the feature in that the input operation, whereby records are fed into the sorting system, may be interrupted at any time and subsequently resumed, in which case the additional record words fed into the system are sorted with the record words previously entered into the system. In addition, the system is capable of providing sorted outputs simultaneously with input operations. That is, a first group of records may be produced by the system in a sorted condition, while a second group of records to be sorted are being fed into the system.

The present invention relates to electronic digital processing systems, and it relates more particularly to an improved sorting system which responds to a series of multi-digit binary words, representative of records to be sorted, and which is capable of sorting the words into an ascending or descending sequence as determined by an identifying control number assigned to each of the words.

The present invention is of the same general type as described in copending application Ser. No. 349,539, filed Mar. 3, 1964, in the name of the present inventor, and which has now issued as United States Patent 3,329,-939.

As noted above, the improved system and mechanism of the invention is capable of rearranging data into a desired sequence, and it is intended to be used as an adjunct to a general purpose computer. The primary objective of the invention is to provide a system which is capable of rearranging data more rapidly and on a more rapidly and on a more economical basis than prior art sorting systems, including the usual general purpose digital computer now in use.

As mentioned above, the sorting system of the invention is intended to be attached to the appropriate transmission channels of a digital computer. When so attached, the sorting system relieves the computer of one of its most frequent and time-consuming operations.

The aforesaid sorting operation is usually carried out in large scale digital comptuers by sorting small numbers of records and then by successive merging operations. This procedure, however, is time consuming and, as mentioned, when the sorting system of the invention is used in conjunction with the computer, the sort can be achieved on a much more rapid and economical basis.

A feature of the improved sorting system of the invention is that it can be attached to a wide variety of present day digital computers, including those using magnetic tape buffering equipment.

The uses to which the system of the invention may be applied include magnetic tape sorting; large volume table look-up as required, for example, in inventory control, billing, mailing list preparation, library retrieval, and so on; numerical computations in which placing data in a particular order is an essential part; and general storage.

The records which are to be sorted in the system of the invention are represented by equal length multi-bit binary words. Each word includes a control field bearing an identifying number which, in turn, is represented in usual manner in multiple bit binary digital form. In the embodiment to be described, it will be assumed that the identifying number for each of the records is an integer. Then a sort will be accomplished when the identifying numbers in the control fields of a series of records represent a monotonic sequence of numbers (increasing in the embodiment to be described).

The system of the invention is controlled to undergo an input mode, a sort mode and an output mode. These different modes will be described in detail herein. During the input mode, the system accepts the records serially and in a random arrangement insofar as their identifying numbers are concerned. Then, as mentioned above, the system of the invention serves to sort the records in an ascending or descending sequence, as determined by the integer value of their identifying numbers.

When all the records to be sorted have been fed into the sorting system of the invention, the system then enters the sort mode, so that the records may be sorted into either a descending or ascending order as determined by their identifying numbers. Finally, the system enters the output mode, and it then supplies the records to the associated equipment in the sorted condition.

A feature of the sorting system to be described is that the input mode can be terminated for any number of word times after any number of records have been fed into the system. Thereafter, the input mode can be resumed at any word time, and additional records can be entered into the system. These latter records are then sorted in the system with the records previously entered therein.

Another feature of the invention is that it can deliver the sorted records during the output mode on a "destruct" basis, or on a "non-destruct" basis. When delivered on the "destruct" basis, the sorted records, fed out of the system during the output mode, are replaced by "blanks." However, when the output records are delivered on the "non-destruct" basis, for each of the sorted records fed out of the system a counterpart is retained in the system.

When the outputs are delivered on either the "destruct" or "non-destruct" basis, the output mode of the system can be stopped and later resumed at the same point in the sorted sequence at which it was stopped. In addition, when the outputs are delivered on the "non-destruct" basis, the system has the feature in that the output mode can be stopped at any point, and then after a brief return to the sort mode, the outputs can be fed out of the system once more in sequence from the beginning.

As mentioned above, when the output records are delivered on the "destruct" basis, "blanks" are fed into the system. These "blanks," as will be described, each have a control field which contains a selected control number. However, the data fields of the "blanks" can contain a subsequent set of records to be sorted. This means that the new set of records to be sorted may be fed into the machine, while the machine is still outputing a sorted previous set. Therefore essentially continuous operation can be achieved from one set of records to the next.

The operation of the sorting system of the invention, as will be described, depends in part on the facility for separating the records to be sorted, so that they may be contained in delay line type memories of lengths of 1, 1, 2, 4, 8 . . . $2^n$ units respectively. The number of such memories chosen in the progression depends upon the desired capacity of the sorting system. Extreme flexibility can be achieved, since any commercial embodiment of the sorting system can be tailored to process any desired number of records.

For purposes of simplifying the description of the invention as much as possible, the embodiment to be described is assumed to include five of the aforesaid delay-line type memories, and these memories have respective lengths of 1, 1, 2, 4, 8, units. The selection is such that two of the memories each holds one record, one of the memories holds two records, one of the memories holds four records, and one of the memories holds eight records. Whenever a record is placed in any one of the memories, it may be removed from that memory a number of steps later, as determined by the capacity of the particular memory.

In the embodiment to be described, for example, any record placed in either of the two least memories can be recovered one step (one word time) later; any record placed in the third memory can be recovered two steps (two word times) later; any record placed in the fourth memory can be recovered four steps (four word times) later; and any record placed in the fifth memory can be recovered eight steps (eight word times) later.

The aforesaid delay-line type memories are synchronous, and in the embodiment to be described, the memories are provided by recording the records on different tracks of a magnetic tape, and by subsequently reproducing the information from each track at the required different word time delays. This permits the different records to be placed simultaneously in all the memories, and it also allows records to be recovered simultaneously from the memories. It should be evident, however, that many types of delay-line type memories are suitable for the purpose.

During the input mode of the system, the received records are placed in the different memories during successive word times in serial manner, so that the first record is compared with the contents of the empty system, and each successive record is compared with the previously inputed records. The contents of the empty system are represented by "blanks" which bear control numbers larger than the identifying number of any record to be sorted.

The first record received during the input mode will be placed in the first least memory. Then, when the second and successive records are serially received, they are compared with the numbers received from the memories in which records have already been placed, and the augmented set of records is placed in the different memories.

As the records are compared during the input mode of the system, the least record at any particular instance is altered by appending an extra number to it. This distinguishes the least record and makes it larger than any undistinguished record in the system. The altered record is then again compared with the other records and is placed in the greatest (longest) memory to contain records.

As each record appears at the output of the corresponding memories, any such appended distinction is removed, so that during the input mode, only one altered record is compared with the other records at any given instant. The purpose of this operation, and the manner in which it is carried out, will be described in detail in the following description.

As noted above, at the termination of the input mode, the system enters the first phase of the sort mode. During the first phase of the sort mode, each record leaving the least memory is distinguished in the same manner as in the input mode discussed above. This makes that particular record larger than any undistinguished record from any of the other memories. This distinguished record is then compared with the outputs from the other memories, and it is usually placed in the longest memory. As will be noted later, there are certain instances in which this distinguished record will be found to be less than one of the memory outputs, and when that eventuality arises, it will be placed in a shorter memory.

Eventually, of course, all the records will be distinguished during the first phase of the sort mode. The last record to be so distinguished will be the last record in the sorted file of records. If, after all the records have been distinguished, the file of records is still not in proper order, the system enters the second phase of the sort mode and the appended distinguishing numbers are removed from all the outputs from the different memories until such time as each record in the system has been read from a line at least once, during which time the procedure of distinguishing the records from the least memory is continued. By the means outlined in the preceding paragraph, successive passes of the records through the different memories is accomplished. Finally, the records will become sorted, and the system can be made to enter its output mode so as to supply the sorted records to appropriate associated equipment.

Other features, objects and advantages of the system of the invention will become apparent from a consideration of the following description, when the description is taken in conjunction with the accompanying drawings, in which:

FIGURE 1 is a schematic representation of the format of a typical record as processed by the system of the invention;

FIGURES 2 and 3 are schematic block representations of the system of the invention, in one particular embodiment;

FIGURE 4 is a representation of the interconnections of a plurality of sorting blocks, included in a sorter forming part of the system of FIGURE 2;

FIGURE 9 is a table representing the particular set of records at the completion of the input mode;

FIGURE 10 is a table representing a first phase of the sort mode for the particular set of records;

FIGURE 11 is a table representing a subsequent phase of the sort mode;

FIGURE 12 is a table representing the output mode for the particular set of records;

FIGURES 13 and 14 are logic diagrams of suitable sorting networks for use as sorters in the system of the invention;

Figures 1, 2:
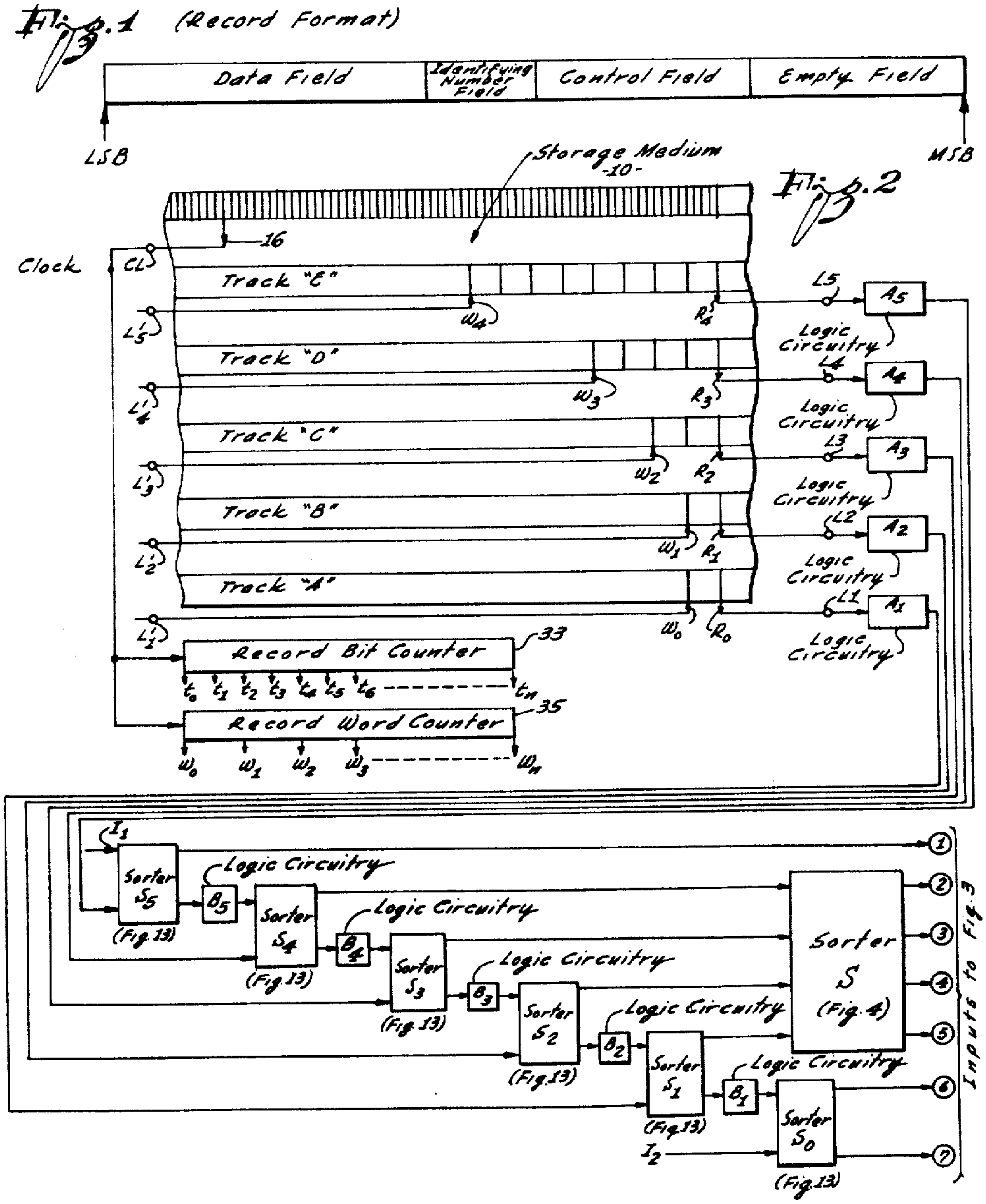

The format of the records, and other words, processed by the sorting system of the invention is shown in FIGURE 1. As illustrated in FIGURE 1, each of the words includes a data field in which the data pertaining to the particular record is contained in binary coded form. Adjacent the data field is an identifying number field which contains the identifying number for the record, this being in the form of a multi-bit binary number representing a particular integer. A control field is placed adjacent the identifying number field, and this control field is treated during the processing by the system, so as to alter the identification of the record, as will be described.

An "empty field" is disposed at the end of the record. This field is utilized to permit time for switching and control operations, so that the circuitry will have settled by the time the control field is reached. It should be mentioned here that the most significant bit of the record is to the right, and that the record is sensed from the right from the most significant bit to the least significant bit. That is, each record sensed by the system is first sensed through the interval of the empty field; then the control field is sensed, followed by the identifying field. This permits the identifying number to be increased any desired extent depending upon the more significant bits which may be inserted in the control field. Lastly, the data field is processed by the system.

In addition to the records introduced to the system for sorting, other words are also passed through the system from time to time; these being designated "blanks" (B) in which the data field and identifying number field are all 1's; or "blanks" (Z) in which the data field and identifying number field are all 0's. There are actually two types of "blanks" (B and B**) used in the system to be described which are distinguished from one another by the number placed in the control field. Also, there are several types of record words, which are also distinguished from one another by the numbers in their respective control field.

The different words handled by the sorting system to be described can be represented by the following table:

| Label | Data and Identifying Fields | Control Field |
|---|---|---|
| B** (blank) | All 1's | 111 |
| B* (blank) | All 1's | 110 |
| D* (altered record) | Record data and identifying number. | 110 |
| B (blank) | All 1's | 010 |
| D+ (altered record) | Record data and identifying number. | 010 |
| D (record) | do | 100 |
| Z (blank) | All 0's | 000 |

The identifying field of each of the record words labeled D, D+ or D* includes a binary representation of an integer identifying the particular record. The most significant bit of the number in the identifying field is adjacent to the control field of the particular word. Therefore, as mentioned above, the identifying number which identifies and controls the sort of the particular record appears adjacent the control field, as shown in FIGURE 1. Then, the bits in the control field serve to increase the significance of the identifying number in the identifying field.

At least one bit position in the data field of the D, D+ or D* records must be a 0. It follows that if the contents of the combined data identifying and control fields are considered as binary integers, they are naturally ordered if a count is taken of the restriction of the data field to contain at least one zero. Then, at all times:

$$Z<D<D+<B<D^*<B^*<B^{**}$$

As mentioned above, the flow of data into, within and out of the sorting system of the invention can be conveniently divided into three modes, namely the input, sort and output modes. During the input mode, either data is placed in the different memories from an associated computer, or other associated data source. Then, in the event of interruption of any such input data, blank records (B) can be placed in the memories of the system.

The embodiment shown in FIGURE 2, for example, includes a storage medium 10. This storage medium 10 may include, for example, a magnetic memory drum, or memory tape, on which different tracks or channels are provided to form different delay-line type memories for the words (FIGURE 1) processed by the system. As mentioned above, the memories may take the form of delay lines, or other appropriate forms, having different lengths in a predetermined progression corresponding to the different numbers of words to be respectively stored therein. In the illustrated embodiment, the memories, as noted above, are constructed to store 1, 1, 2, 4, 8 words respectively.

The storage medium 10, in the illustrated embodiment, includes a magnetic tape which is shown in fragmentary form and which is designated 12. The tape is assumed to be moving to the right in FIGURE 1. The tape includes a plurality of different channels, or tracks, which extend along its length. Corresponding read and write electromagnetic transducer heads are provided for recording the words in the different tracks, and for subsequently reading the recorded words. These read and write heads are designated by arrows in FIGURE 1.

The magnetic tape 12 may also include a timing track which has regularly spaced magnetic recordings, these being used for bit timing clocking purposes. A transducer read head is magnetically coupled to the timing track, and it responds to the recordings on the track to provide clock pulses CL at its output. These clock pulses represent the bit timing in each of the words processed in the system.

The clock pulses are also used to synchronize the operation of a record bit counter 33 and of a record word counter 35. The bit counter 33 produces timing pulses $t_0$, $t_1$, $t_2$ . . . representative of the different bit times in each word; and the word counter produces timing pulses $w_0$, $w_1$, $w_2$ . . . designating successive word times in the system.

The magnetic tape 12 includes a track designated A, and this track serves as the least memory for the system. A write head $W_0$ is magnetically coupled to the track A, and this head responds to signals applied to the input terminal $L_1'$ to record the signals in that track. A read head $R_0$ is also magnetically coupled to the track A, and the read head is displaced from the write head along the track a distance corresponding to one word time. Therefore, any word stored in the least memory is reproduced from the memory during the following word time.

The second unit length memory is provided by a track B on the magnetic tape 12, and an appropriate write head $W_1$ and read head $R_1$ are magnetically coupled to the track B. The write head $W_1$ responds to signals applied to the input terminal $L_2'$ to record the corresponding magnetic signals on the track B. The read head $R_1$ is displaced along the track B a distance corresponding to one word time from the write head $W_1$. Therefore, in the second memory, any word entered into the memory during a particular word time may be recovered during the following word time.

The magnetic tape 12 also includes a track designated C. A write head $W_2$ and a read head $R_2$ are magnetically coupled to the track C. The read head $R_2$ is displaced along the track C a distance corresponding to two word times. This latter track forms the third memory, and the write head $W_2$ responds to input signals introduced to the input terminal $L_3'$ to produce corresponding recordings in the track C. In this third memory, a word introduced to the memory during any word time may be recovered two word times later. Also, the third memory, unlike the first two memories, is capable of storing two words, rather than one.

A fourth memory is also provided on the tape 12 by a track D, and a write head $W_3$ and read head $R_3$ are magnetically coupled to that track. The write head $W_3$ responds to electrical signals applied to the terminal $L_4'$ to produce corresponding recordings in the track D. The read head $R_3$ is displaced from the write head $W_3$ along the track a distance corresponding, for example, to four words. Therefore, the fourth memory is capable of holding four separate words, and any word introduced to the memory during any particular word time can be recovered four word times later.

A fifth memory, capable of storing eight words, is also provided on the tape 12 in a track E. A write head $W_4$ and a read head $R_4$ are magnetically coupled to the track E. The write head responds to signals received from a terminal $L_5'$ to record corresponding signals in the track E. The read head $R_4$ is displaced from the write head $W_4$ along the track E a distance corresponding to eight word times. Any word introduced to the fifth memory may be recovered eight word times later.

As mentioned above, the number of tracks shown on the magnetic tape 12 in FIGURE 1 is for purposes of illustration only. More or less tracks may be used, depending upon the maximum number of records to be sorted in the system. As mentioned, the number of memories in any system follows a progression 1, 1, 2, 4, 8 . . . $2^n$.

The read heads $R_0$–$R_4$ are connected to corresponding input terminals $L_1$–$L_5$ which, in turn, are respectively connected to logic circuits designated $A_1$, $A_2$, $A_3$, $A_4$ and $A_5$. These circuits will be described in detail subsequently. The logic circuits $A_1$–$A_5$ are respectively connected to sorters $S_1$–$S_5$. These sorters will also be described.

As shown, each sorter $S_1$–$S_5$ includes two input terminals and two output terminals. The individual sorters respond to signals applied to the two input terminals to process the signals such that the higher signal appears at one of the output terminals and the lower signal appears at the other output terminal. A first input terminal $I_2$ is connected to a sorter $S_0$, which is similar to the sorters $S_1$–$S_5$, and a second terminal $I_1$ is connected to the sorter $S_5$.

The first output terminals of the sorters $S_1$–$S_5$ are respectively connected to logic circuits $B_1$–$B_5$ which, in turn, are respectively connected to the second input terminals of the sorters $S_0$–$S_5$. The second output terminals of the sorters $S_1$–$S_4$ are connected to the input terminals of a sorter S.

The sorter S is made up of a plurality of individual blocks, such as shown in FIGURE 4. Each of these individual blocks is similar to the sorters $S_0$–$S_5$, referred to above, and each functions in the same manner. The blocks of the sorter S, as shown in FIGURE 4, are connected so that the signals applied to the input terminals are rearranged by the blocks, so that they appear in ascending order at the four output terminals 2, 3, 4 and 5. The blocks in the sorter S may be inhibited, so that the signals applied to the input terminals are passed through the sorter in their original order. When that occurs, the signals applied to the input terminals appear in the same order at the output terminals 2, 3, 4 and 5.

The other output terminal of the sorter $S_5$ is connected to the output terminal 1 of FIGURE 2; and the two output terminals of the sorter $S_0$ are connected to the output terminals 6 and 7 of FIGURE 2, respectively. The output terminals 1–7 of FIGURE 2 are connected to the correspondingly numbered input terminals of the circuit of FIGURE 3.

The input terminals 1–5 of FIGURE 3 are connected to respective sorters $S_5'$, $S_4'$, $S_3'$, $S_2'$ and $S_1'$. The input terminal 6 of FIGURE 3 is connected through a logic circuit $C_1$ to the other input terminal of the sorter $S_1'$. The first output terminals of the sorters $S_1'$, $S_2'$, $S_3'$ and $S_4'$ are connected through logic circuits $C_2$, $C_3$, $C_4$ and $C_5$, respectively, to the second input terminals of sorters $S_2'$, $S_3'$, $S_4'$ and $S_5'$.

The second output terminals of the sorters $S_5'$, $S_4'$, $S_3'$, $S_2'$ and $S_1'$ are connected through respective logic circuits $F_5$, $F_4$, $F_3$, $F_2$ and $F_1$ to corresponding output terminals $L_5'$, $L_4'$, $L_3'$, $L_2'$ and $L_1'$. The first output terminal of the sort $S_5'$ is connected to an output terminal $O_1$, and the input terminal 7 of FIGURE 3 is connected to an output terminal $O_2$. The output terminals $L_1'$–$L_5'$ are connected back to the correspondingly identified input terminals of the different memories in FIGURE 1. The terminals $O_1$–$O_2$ constitute the output terminals in which outputs from the sorting system appear.

At the beginning of the input mode, the memories A–E are filled with blanks of any type. The logic circuits $A_1$–$A_5$ respond to these blanks (absence of records) to apply the maximum blanks B (all 1's) to the sorters $S_1$–$S_5$. This expedient whereby the logic circuits $A_1$–$A_5$ generate maximum blanks B in response to the absence of records from the corresponding memories, obviates the necessity of filling the system with the maximum blanks B** before each input operation.

Figure 5:
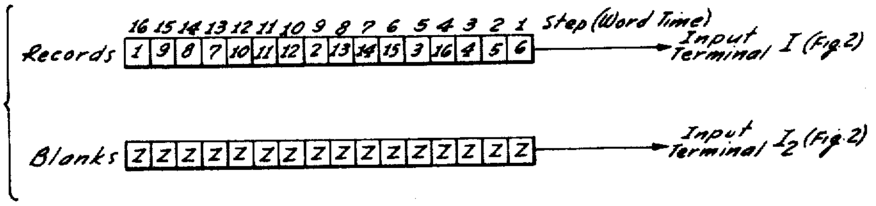
FIGURE 5 is a representation of a particular set of records inputed to the system on a non-interrupt basis.

Now, to carry out the input mode, and as shown schematically in FIGURE 5, records (which have the format shown in FIGURE 1) are introduced serially to the input terminal $I_1$ and minimum blanks Z (all 0's) are introduced to the input terminal $I_2$. In the illustrated examples of FIGURE 5, it is assumed that sixteen records are to be introduced into the sorting system during sixteen successive word times, and that these records are identified by respective identifying numbers corresponding to decimal integers 1–16 in the illustrated order.

The action of the sorting system is such that during the input mode the maximum blanks B (all 1's) appear at the output terminal $O_1$ and the minimum blanks Z (all 0's) appear at the output terminal $O_2$. During the input mode, as each record is input into the sorting system, it is compared with the outputs of the different memories A–E. As mentioned above, until any memory is filled with records, its outputs are all transformed to maximum blanks B by the corresponding logic circuit $A_1$–$A_5$. However, when records are obtained from the outputs of any of the memories, they are compared with the successive input records during successive word times, and the least of these records at each word time is altered by the logic circuit $C_1$, so that it becomes a maximum D* record. This causes the altered lowest record to be placed in the longest memory exhibiting a record output. The $A_1$–$A_5$ logic circuits remove the asterisk (*) from each record outputed from the corresponding memories A–E.

Figure 6:
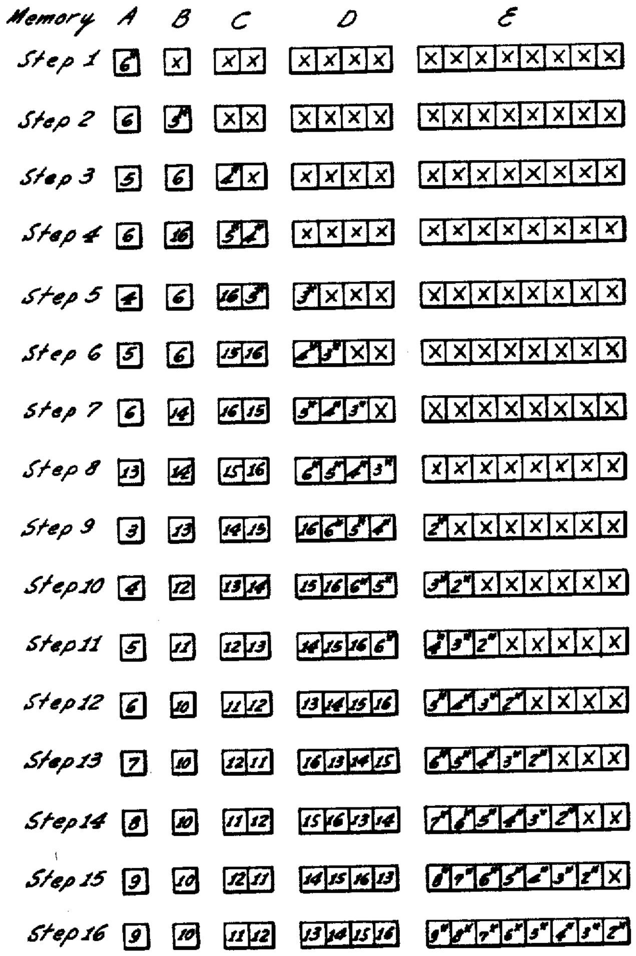
FIGURE 6 shows how the records of FIGURE 5 flow through the system during the input mode of the system.

In the particular example shown in FIGURE 5, the input operation proceeds from record to record in successive word times in the manner shown in FIGURE 6. That is, during the first word time, the input record 6, which less than all the B** blanks applied to the sorters by the $A_1$–$A_5$ logic circuits, is altered by the $C_1$ logic circuit and, since it is still the least ($D^* < B^{}$), it is placed in the least memory A. Then, during the second word time, the next record 5, being less than the record 6**, receives the asterisk (D*) from the logic circuit $C_1$, so as to become the greater record. This results in the record 6 being placed in the least memory A during the second word time, and the record 5* being placed in the memory B.

Likewise, as the input operation proceeds from word time to word time, the different records introduced into the sorting system are handled in the manner shown in FIGURE 6. The particular example of FIGURE 6 assumes that there is no interruption to the input operation, and that the input operation proceeds from step to step and word time to word time, until all the records are fed into the system. At the end of the sixteen word times the input mode is terminated, and the records appear in the system in the order shown in step 16 of FIGURE 6.

Figure 7:
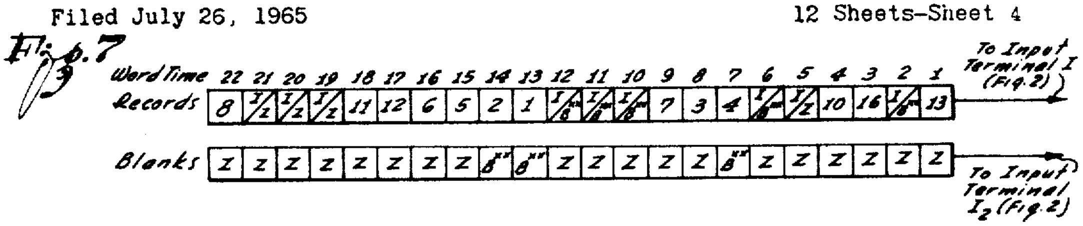
FIGURE 7 is a representation of a particular set of records inputed to the system on an interrupted basis.
Figure 8:
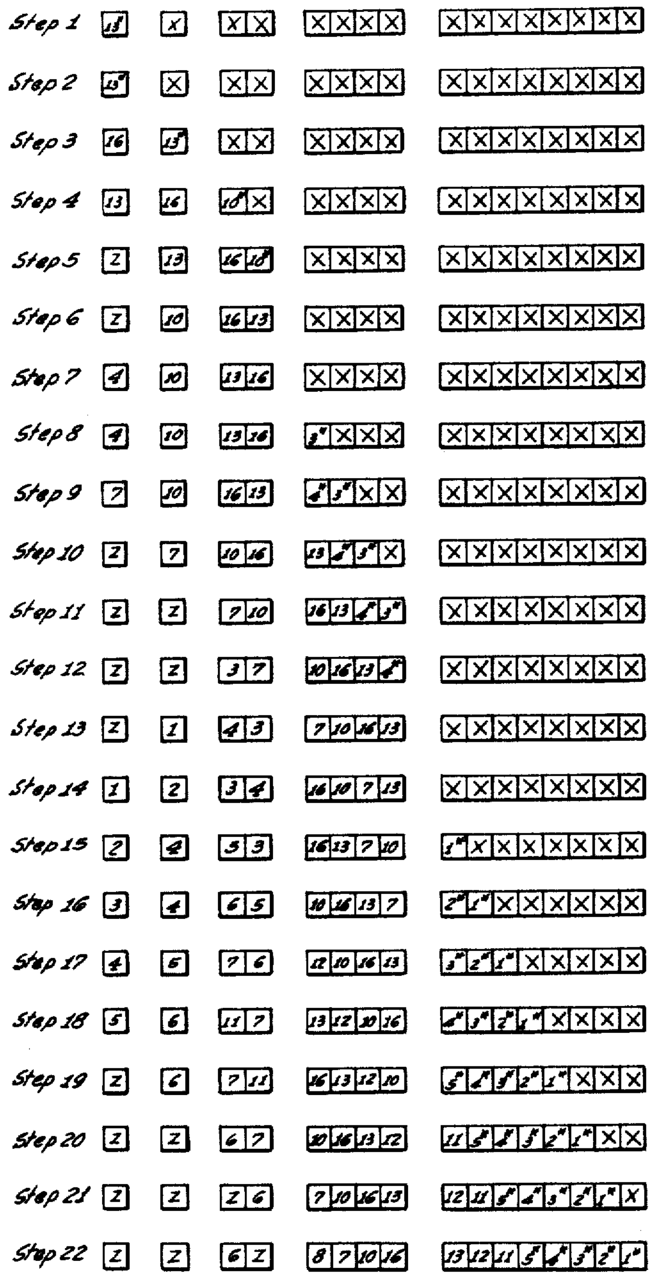
FIGURE 8 shows how the records of FIGURE 7 flow through the system during the input mode.

Should the transmission of records to the storting system during the input mode be interrupted, as shown in the examples of FIGURES 7 and 8, the blanks B** are normally applied to the input terminal $I_1$, and the blanks Z are normally applied to the input terminal $I_2$. This causes the previously inputed records to be retained in the system, and it prevents such records from being outputed at the output terminals $O_1$ or $O_2$.

However, during the interruption of the input mode, it is important to assure that as a succession of records shifts into any of the memories, there are no interposed B blanks in the series. For that reason, during the interrupted phase of the input mode, the inputs and outputs of each memory are examined. Whenever a memory is found with a record input and a B blank output Z blanks are then introduced to the system by way of both the input terminals $I_1$ and $I_2$. This results in the introduction of Z blanks into the different memories.

The aforesaid introduction of Z blanks into the system at both the input terminals $I_1$ and $I_2$ is continued from one word time to the next during the interrupt phase of the input mode until none of the memories exhibits a record input and a B blank output, which is indicative of a partially filled condition. Then the system reverts to the introduction of B** blanks to the input terminal $I_1$ and of Z blanks to the input terminal $I_2$.

During the interrupt phase of the input mode, the Z blanks from the least memory A are not altered by the $C_1$ logic circuit, as is normally the case with the least record in the system, as described above.

After an interruption in the input mode, the inputing of records can be resumed at any word time. If blanks Z were placed in the system during the interruption of the input mode, they will be displaced out of the system by subsequently inputed records, after the longest record-bearing memory has been filled with records.

Therefore, when the input mode is resumed, records are again introduced to the system by way of the input terminal $I_1$, and Z blanks are again introduced to the input terminal $I_2$, this being continued until the longest data-bearing memory is filled with records, at which time records D or D*, or Z blanks, will appear at the output of each memory containing records. When this condition is reached, B blanks are introduced to the system by way of the input terminal $I_2$ as long as Z blanks are detected in the memory $L_1$ or until the inputing of records is again interrupted. Should such a subsequent interruption occur, then B blanks are applied to the input terminal $I_1$ and Z blanks are applied to the input terminal $I_2$.

When the absence of Z blanks in the memory $L_1$ is detected, the system resumes its normal phase of the input mode. That is, records continue to be fed to the system by way of the input terminal $I_1$ and Z blanks are fed to the system by way of the input terminal $I_2$.

As shown in the example of FIGURES 7 and 8, records are inputed to the system at successive word times during the input mode, with interruptions occurring and with inputing again being resumed at selected word times. It will be remembered that during each word time of the input mode, a B** blank is displaced out of the output terminal $O_1$ and a Z blank is displaced out of the output terminal $O_2$.

During the first word time of the input mode, a record "13" is fed into the system by way of the input terminal I (FIGURE 7), and a Z blank is simultaneously applied to the system by way of the input terminal $I_2$. The record "13" is distinguished to 13* by the logic circuit $C_1$ (FIGURE 3). However, since it is still less than the B blanks generated by the logic circuits $A_1$–$A_5$ due to the unfilled condition of all the memories A–E, the record 13 is placed in the least memory A (step 1** of FIGURE 8).

During the second word time of the input mode, an interruption occurs, as designated I in FIGURE 7. Since under the conditions existing at that word time, there are no memories partially filled with records, a B blank is applied to the input terminal $I_1$ and a Z blank is applied to the input terminal $I_2$. The record 13* remains in the least memory during this word time, as shown in step 2** of FIGURE 8.

Inputing is resumed at the third time, and a record "16" is fed into the system by way of the input terminal $I_1$, and at the same time a Z blank is fed to the system by way of the input terminal $I_2$. Since the record 16 is less than the record 13*, the former is placed in the least memory A and the latter is placed in the memory B as shown in step 3 of FIGURE 8. During the fourth word time, a record "10" is introduced to the system by way of the input terminal $I_1$, and a Z blank is introduced to the system by way of the input terminal $I_2$. The record 10, being the least record in the system, is altered by the logic circuit $C_1$ of FIGURE 3, and the resulting record 10* is placed in the memory C, the records 13 and 16 being placed in the memories A and B respective (step 4 of FIGURE 7).

Another interruption I occurs at the fifth word time, as shown in FIGURE 7. However, a condition existed during the previous word time in which the memory C was only partially filled with records (step 4 of FIGURE 8). Therefore, in order to prevent a B blank from being shifted into the memory C behind the 10* record, with a resulting deleterious effect on the sorting process, the condition is detected, and for the particular interrupt phase of the fifth word time, Z blanks were applied to both the input terminals $I_1$ and $I_2$. This causes the record 16 to shift into the memory C adjacent the record 10*, the record 13 to shift into the memory B, and a Z blank to shift into the least memory A (step 5** of FIGURE 8).

The aforesaid interrupt of the fifth word time is continued to the sixth word time. However, during the fifth word time there were no partially filled memories, so that a normal interrupt control is provided for the sixth word time, whereby a B blank is applied to the input terminal $I_1$ and a Z blank is applied to the input terminal $I_2$. This control produces a rearrangement of records, as shown in step 6** of FIGURE 8, but the Z blank remains in the least memory A. It will be remembered that the $C_1$ logic circuit is ineffective to alter the Z blanks coming out of the least memory A.

During the seventh word time, a record "4" is fed into the system by way of the input terminal $I_1$. This resumption of the inputting of records occurs at a word time (step 6 of FIGURE 8) when there are no memories partially filled with records. Then, since there is a Z blank in the least memory A, a B blank is now applied to the input terminal $I_2$. The record "4" now displaces the Z blank in the least memory A, and the Z blank is forced out of the system by way of the output terminal $O_2$, since it is less than the record "4**."

During the eighth word time, a record "3" is applied to the system by way of the input terminal $I_1$ (FIGURE 7). Now, since there are no Z records in the least memory, a Z blank is applied to the input terminal $I_2$. The record "3" is altered to 3* by the logic circuit $C_1$, and is placed in the memory D. The other records are distributed in the memories A, B and C, as shown by the eighth step in FIGURE 8.

During the ninth word time, a record "7" is placed in the system by way of the input terminal $I_1$. The conditions are the same as in the previous word time. That is, there is no Z blank in the least memory (step 8 of FIGURE 8). Therefore, a Z blank is applied to the input terminal $I_2$. The record "4" is now altered to 4*, since the 3* record remains in the D memory. The resulting 4* record is placed in the D memory adjacent the 3* record.

During the tenth word time another interrupt occurs, as shown by the designation I in FIGURE 7. Again, the condition of a partially filled memory exists, in this case in the D memory (step 9 of FIGURE 8), so that again Z blanks are applied to both the input terminals $I_1$ and $I_2$. This again causes a Z blank to appear in the least memory A, and the record "13" is shifted into the D memory.

The aforesaid interruption continues during the eleventh word time, as shown in FIGURE 7. During this latter word time, the condition of the partially filled D memory persists (step 10 of FIGURE 8), so that again Z blanks are applied to both the input terminals $I_1$ and $I_2$. The D memory is now filled (step 11) as the record "16" is shifted into that memory, and Z blanks now appear in both the A and B memories.

The aforesaid interruption (I) continues during the twelfth word time. However, there are now no partially filled memories (step 11 of FIGURE 8), so that there is no need to feed another Z blank into the system. Instead, a normal control is exerted, whereby a B blank is applied to the input terminal $I_1$ and a Z blank is applied to the input terminal $I_2$. The records become rearranged, as shown in step 12** of FIGURE 8, but the Z blanks remain in the A and B memories.

During the thirteenth word time, the inputing of records is resumed and a record "1" is applied to the input terminal $I_1$. The condition now exists of a Z blank being contained in the least memory A (FIGURE 8, step 12), but there is no partially filled memory. Therefore, a B blank is applied to the input terminal $I_2$. The remaining Z blank is now placed in the least memory A, the record "1" is placed in the memory B, and the other records are rearranged in the manner shown in step 13 of FIGURE 8. It will be observed that as the altered records 4* and 3* leave the D memory they are returned to their unaltered 4 and 3** form, this being achieved by the logic circuit $A_1$–$A_5$, as will be described. It will also be observed that the Z blanks are not altered as they leave the A memory.

During the fourteenth word time the inputing of records is continued, and a record "2" is fed to the input terminal $I_1$. We now have the same condition as in the previous word time in that there are no unfilled memories, and a Z blank exists in the least memory A (step 13 of FIGURE 8). Therefore, again a B blank is applied to the input terminal $I_2$. This displaces the last Z blank out of the least memory A, and the records are now arranged in the memories in the manner shown in step 14** of FIGURE 8.

For the fifteenth word time, a record "5" is input to the system by way of the input terminal $I_1$ (FIGURE 7). There is now no Z blank in the least memory A, and there is no unfilled memory. Therefore, normal input phase conditions are restored, and a Z blank is fed to the input terminal $I_2$. The record "1" is altered by the logic circuit $C_1$, and it becomes 1*, the greatest record. The record 1* is placed in the E memory, as shown in step 15 of FIGURE 8. The other records are distributed in the manner also shown in step 15 of FIGURE 8.

The normal input mode continues during the word times 16–18, with the records "1," "12" and "11" being successively placed in the system by way of the input terminal $I_1$, and with Z blanks being successively applied to the input terminal $I_2$. Another interrupt occurs at word time 19. During the latter word time the memory E is unfilled, and in order to prevent a B blank from being fed into that memory, Z blanks are applied to both the input terminals $I_1$ and $I_2$. This creates the condition shown in step 19** of FIGURE 8.

The latter interrupt phase continues through the word times 20 and 21, and since the same conditions prevail as during the word time 19, the Z blanks are still applied to both the input terminals $I_1$ and $I_2$ during each of these word times. Therefore, at the twenty-first word time, there are Z blanks in both the A and B memories, and there is a Z blank in the C memory adjacent the record 6.

Now, when the input mode is resumed at the word time 22, a record "8" is applied to the input terminal $I_1$ (FIGURE 7). Since there is no Z blank in the least memory A, and since there is an unfilled memory E, a Z blank is applied to the input terminal $I_2$. This causes the records and the Z blanks to assume the positions shown in step 22 of FIGURE 8.

All the records to be fed into the sorter for the particular example shown in FIGURES 7 and 8 have now been entered into the system. To complete the input mode, B** blanks are fed to the system by way of the input terminal $I_1$, and B blanks are fed to the system by way of the input terminal $I_2$ (FIGURE 9). This operation is continued, as shown, for example, in the three steps of FIGURE 9, until all the Z blanks have been displaced out of the system. The system is now ready to enter the sort mode.

It will be observed from the diagram of FIGURE 9, and as mentioned above, that during the completion of the input mode, the B blanks are introduced to the system by way of the input terminal $I_1$, and the B blanks are introduced to the system by way of the input terminal $I_2$. The B blanks are displaced out of the system at the output terminal $O_1$, so that there is no shift of record towards that output terminal. The B blanks, on the other hand, displace the Z blanks from the memories, in a step-by-step manner as shown in FIGURE 9, and the Z blanks move out of the system at the output terminal $O_2$.

The sort mode consists of two phases, these being designated as phase I and phase II. When the system first enters the sort mode, it undergoes phase I. If a sorted condition is not detected at the end of the phase I, the system enters into the phase II of the sort mode, and it then returns to the phase I.

During the phase I of the sort mode, the output from the least memory A is distinguished, so that it becomes either D* or B*. The consequence of this transformation, of course, is artificially to make the smallest record or B blank appear to be greater than all the undistinguished records or B blanks in the system at that particular moment. The distinguished record or B blank is made, therefore, to pass to a longer memory.

As the sort mode continues in phase I, the number of distinguished records (D*) increases until all the records are distinguished. The presence of a distinguished record D* in the least memory A, in the absence of a completely sorted condition of the records, is used to signal the beginning of phase II of the sort mode.

In phase II of the sort mode, the output from the least memory is distinguished (as in phase I). However, unlike phase I, the distinguishing bits of the records (D*) or B blanks (B*) appearing at the outputs of the memories B–E are now removed, so that the blanks or records are returned to the B or D form. Phase II is continued until all the distinguishing bits have been removed from all the records which are not in the longest record-bearing memory. This condition is detected, and phase I is resumed.

A convenient signal for terminating phase II of the sort mode is obtained by providing the first record to be distinguished in phase II with a minor alteration, that is, by transforming the first record to D+ (010) instead of D* (110). The end of phase II is indicated, and the system is returned to phase I, when the D+ record is detected at the output of the longest record-bearing line.

The phase I of the sorting mode is always resumed at the end of phase II. The completion of the sorting mode is detected by the absence of an exchange of memory outputs for a complete pass. Such exchanges, or lack of exchanges, are detected by testing the status of the exchange flip-flops in the sorter circuits.

As shown in FIGURE 10, the system moves immediately from the completion of input mode (FIGURE 9) to phase I of the sort mode. During phase I, and as mentioned above, the output from the least memory A is distinguished, so that it is placed in a greater memory.

As shown in FIGURE 10, for example, at the end of step 1, the output from the least memory A is "2," and it becomes 2*. Therefore, during step 2 of phase I, the record 2 is placed in the D memory. Since the output from the E memory is 5*, the latter record is placed back in the input of the E memory. By following the process in a step-by-step manner in the table of FIGURE 10, it will be observed that as each record is outputed from the least memory A, it is distinguished by being transformed to its D* form. Likewise, when a B blank is outputed from the least memory A, it also is distinguished to the B* form. The process continues from step to step, until the 1* record appears in the least memory A. This is a signal for the system to move into phase II of the sort mode. It will be noted that the system moves into phase II, because there is no indication that the sort has been completed at the end of phase I, such an indication would be derived by the detection of no exchanges in the sorters during the entire fourteen steps shown in FIGURE 10.

As noted above, the phase II of the sort mode is similar to phase I, in that the output from the least memory A is distinguished. However, the phase II differs from phase I, in that the outputs from the other memories B–E are returned to their undistinguished form. Moreover, and as noted above, the first output from the least memory A, that is, 1* in the last step in FIGURE 10, is given a minor distinction 1+ in the first step in FIGURE 11, rather than a major distinction 1*, as is the case with the subsequent records.

Following down the first eight steps of the phase II sorting mode shown in FIGURE 11, it will be noted that as each record is output from the least memory A, it is distinguished to the D* form, and that as each record is outputed from the other memories, it is returned to its undistinguished form. The process then continues, step-by-step, until there are no distinguished records in any of the memories, except in the memory E. This condition is detected when the original record 1+ appears at the output of the line E, so that the sorting mode of the system returns to phase I. Then, during the subsequent eight steps of the phase I of the sorting mode, the 1+ record is returned to the 1* form; the outputs from the least memory A are distinguished, but the outputs from the other memories are not changed. It will be observed that when the step 8 of phase I of the sort mode in FIGURE 11 is reached, the records appear in a sorted condition in the system.

It will be appreciated that throughout the sorting mode, the blanks B** are introduced to the input terminal $I_1$, and the blanks Z are introduced to the input terminal $I_2$. This prevents any shift of the records out of the system by way of either the output terminals $O_1$ or $O_2$ during the sorting mode.

Throughout the phase I and phase II of the sorting mode the action of each of the sorters is sensed to determine whether any exchanges were made between the records applied to the input terminals of the individual sorters and the records appearing at the output terminals thereof. When a complete pass occurs (as detected in the logic circuit $A_1$ by the presence of a distinguished record in the least memory A) with no exchanges, the sorted condition of the records is detected, and the system may then enter the output mode. At the next word time, the distinction from the record outputed from each memory A–E is removed. At this subsequent word time, it is the least record in each memory that is outputed, so that the least record in each memory A–E is now "marked." The output mode may be initiated thereafter at any word time, and it may be interrupted at any word time.

The output mode is conceived in a manner to permit interruptions at any word time, as noted above. The completion of the output mode is detected by the presence of a blank in the least memory A. In summary, the procedure during the output mode consists in marking the next least record in each memory A–E when the undistinguished least record is removed by the insertion of a B blank into the particular memory; this being achieved by removing the distinction from that record.

When a record output is desired during the output mode, a B blank is applied to the input terminal $I_1$, and a B blank is applied to the input terminal $I_2$. The B blank is displaced out of the output terminal $O_1$, whereas the B blank causes the least and undistinguished data record to be displaced out of the least memory A and out the output terminal $O_2$. When an interrupt is desired during any word time of the output mode, a Z blank is applied to the input terminal $I_2$, instead of a B blank.

When a B blank first enters a memory, it displaces the least record out of that memory (this record having previously been undistinguished), the next record to appear at the output of the particular memory is the least record then in that memory, and it is marked by removing its distinction.

However, when a record is displaced out of a first memory by a B blank entering the memory, it subsequently regains its distinction, as will be described, if it is to be compared with the output of a memory which contains a record in addition to the particular output.

In other words, and in order to preserve the desired sequence, a record displaced out of a memory is never permitted to proceed past a lesser memory, if the lesser memory contains data. In addition, exchanges of distinguished outputs are not permitted. Therefore, the contents of each memory merely circulates for each step of the output mode, until a B blank is actually introduced to that memory, so as to displace the least and undistinguished record out of the memory.

As menttioned, in order to initiate the output mode, B blanks are applied to the input terminal $I_1$, and B blanks are applied to the input terminal $I_2$. This causes the B blanks to appear at the output terminal $O_1$, and records to appear in sequence at the output terminal $O_2$. As also mentioned, the output mode may be interrupted at any word time by applying B** blanks to the input terminal $I_1$, and Z blanks (instead of B blanks) to the input terminal $I_2$.

The aforesaid formulas are established, in order to assure that the records will be maintained in the proper order during the output mode, even though there may be interruptions in the output mode at any desired word times. These formulas also permit the output mode to be resumed at any word time, by assurring that the next records in the sequence will be displaced down into the shorter memories, so as to obviate the need to wait until the records in the different memories have circulated to the appropriate positions before the output mode can be resumed.

The applications of the formulas outlined above will be observed, by following each step in the output mode example shown in FIGURE 12. It will be observed that the particular output operation of FIGURE 12 is interrupted during the first, third, tenth, thirteenth and seventeenth word times. It will also be observed that, in each instance, the output mode is resumed without having to wait any plural number of word times in order for the records to become properly aligned.

To initiate the output mode, the system steps from step 8 of phase I of FIGURE 11 to step 1 of the output mode of FIGURE 12. During that step, the outputs 1+, 2*, 3*, 5* and 10* from the memories A, B, C, D and E respectively, are returned to their undistinguished states 1, 2, 3, 5 and 10, as they are fed back into the respective memories in step 1 of the output mode, shown in FIGURE 12. The least record in each memory A–E is therefore "marked" at the beginning of the output mode.

As shown in FIGURE 12, step 1 of the output mode is an interrupt. Therefore, a Z blank is applied to the input terminal $I_1$ during that word time, and a B** blank is applied to the input terminal $I_2$. This, as in the sort mode, prevents any of the records from being shifted out of the system during the interrupt word time.

During the second word time of the output mode, the outputing is initiated. To achieve this, a B blank is applied to the input terminal $I_2$, and a B blank is applied to the input terminal $I_1$. The B blank causes the 1 record to be displaced out of the least memory A, and that record appears at the output terminal $O_2$. As shown in step 2 of the output mode in the example of FIGURE 12, since the B blank introduced to the system is greater than the undistinguished record 2, but less than the distinguished records 4*, 6* and 11*, it is placed in the B** memory. That is, the B blank enters the longest memory with an undistinguished output.

Step 3 of FIGURE 12 is another interrupt; and a Z blank is introduced to the input terminal $I_2$, and a B blank is introduced to the input terminal $I_1$. Again, the contents of the system are preserved, and the records become rearranged in the manner shown in step 3. For step 4, the output mode is resumed, this being achieved by applying a B blank to the input terminal $I_2$ and a B blank to the input terminal $I_1$. The 2 record is now displaced out of the system by way of the output terminal $O_2$, and the B blank enters the C memory, as shown. Also, the 4* record loses its distinction, since a B blank has entered the C memory.

For step 5, the output mode is continued, and the 3 record is displaced out of the system. Likewise, for step 6, the output mode is continued, and the 4 record is displaced out of the system. The 6* record loses its distinction since a B blank has entered the D memory. For step 7, the output mode is continued, and the 5 record is displaced out of the system. Now, since the B blanks have entered the D memory, the 7* record loses its distinction. For step 8, the 6 record is displaced out of the system, and the 8 record loses its distinction since the B blanks are in the D memory.

For step 9, the output mode is continued, and the 7 record appears at the output terminal $O_2$. For step 10, another interrupt occurs. Therefore, a Z blank is applied to the input terminal $I_2$, and a B blank is applied to the input terminal $I_1$ as before. The B blanks now enter the memory E, so the 11*** record loses its distinction.

For step 11, the system resumes outputing and the 8 record appears at the output terminal $O_2$. The 12* record from the memory E loses its distinction, but regains it since it is compared with a B blank from memory C which contains a record. For step 11, the system outputs the 8 record. For step 12, the system outputs the 10 record. During the latter step, the 13* record from the memory E loses its distinction. However, it regains its distinction since it is to be compared with the record 11 from data-bearing memory C.

Step 13 is an interrupt, and the contents of the system circulate, as shown in FIGURE 12. The 16* record leaves the E memory during step 13, and loses its distinction. However, it regains its distinction since it is to be compared with the record 12* from the data-bearing memory C.

The system then goes to step 14, during which the 11 record is displaced out of the system. The B* output from the E memory loses its distinction, and is input to the C memory. For the step 15, the record 12 is displaced out of the system at the output terminal $O_2$. The record 13* is displaced out of the C memory and into the B memory during step 14, and loses its distinction in the process. Likewise, the 16* record is displaced out of the memory C and into the memory B during the step 15, and likewise loses its distinction in the process.

During the step 16, the record 15 is displaced out of the system, and the record 16 moves to the least memory A. A blank B* is displaced out of the memory E and into the memory B during step 16. Step 17 is an interrupt, and the record 16 remains in the least memory A, as shown. The last B* is shifted out of the memory E and into the least memory B, losing its distinction in the process.

Finally, during step 18, the output mode is resumed, and the last record 16 is displaced out of the system. The completion of the output mode is detected by the occurrence of a blank B in the least register A. It will be appreciated that during each successive step of the output mode, the record in the system appeared at the output terminal $O_2$ in a descending sorted sequence, as required.

As mentioned above, the B blanks fed into the system during the output mode may contain data in their data fields, so that at the end of the output mode, the words remaining in the system are actually new data. This permits new records to be placed in the sorter for subsequent sorting, while the previously sorted records are being removed from the system. Likewise, as a B blank is introduced to the system to displace a record during the output mode, the introduced B blank may contain in its data field the same record as the displaced record, so that the system operates on a non-destruct basis, in that whenever a record is outputed from the system, its counterpart remains in the system.

Returning now to FIGURES 2 and 3, it will be appreciated that during the input mode, each of the logic circuits $A_1$–$A_5$ serves to supply B** blanks to the input of the sorter S so long as the corresponding memory A–E is not filled with records. This, as mentioned, saves the time which would otherwise be required to prepare the system to receive new data. Each of the logic circuits $F_1$–$F_5$ detects the first output record fed into the corresponding memory A–E, and sets a flip-flop N which indicates when the corresponding memory contains at least one record. Each of the logic circuits $A_1$–$A_5$ then responds to the first record outputed by a corresponding memory A–E to set a flip-flop D to indicate that the memory is full of records. The circuits $A_1$–$A_5$ each also serve to remove the distinction appended to the record output of the corresponding memory during the input mode and sort II mode, if a distinction has been affixed to the particular record.

In the input mode, the logic circuits $B_1$–$B_5$ of FIGURE 2 and $C_2$–$C_5$ are inactive. The logic circuit $C_1$ is active during the input mode, in that (as explained) it appends a distinction to records inputed to the memory A. As mentioned above, distinctions are not appended to Z blanks when they are inputed to the memory A during the input mode.

During phase II of the sort mode, each of the logic circuits $A_1$–$A_5$ removes the aforesaid (*) distinction from the record outputs of the corresponding memory A–E. This occurs if a flip-flop S is set indicating the phase II part of the sort mode. The logic circuits $B_1$–$B_5$ and $C_2$–$C_5$ serve no function in the sort mode. The circuit $C_1$ appends a distinction (during both phase I and phase II of the sort mode) to each word outputed from the memory A, if that word is not a blank Z. The logic circuits $F_1$–$F_5$ detect if the output in any instance is a Z blank.

When the "sort complete" signal is generated, the distinctions are removed by the logic circuits $A_1$–$A_5$ from each record output from the corresponding memories during the next word time. This, as described, serves to "mark" the least record in each line for the output mode.

As noted, the output mode may then be initiated at any word time. If during any particular word time of the output mode a corresponding memory contains no undistinguished data record, the distinction from the record which passes through the circuits $A_1$–$A_5$ is removed. If the corresponding memory contains a record, and a distinguished record enters one of the logic circuits $A_1$–$A_5$, the corresponding sorting circuits $S_1$–$S_5$ are inhibited by the particular logic circuit $A_1$–$A_5$, so that no exchange is made and the distinguished record may be returned to its original memory.

The logic circuits $B_1$–$B_5$ serve, during the output mode, to restore the distinction to a corresponding record under certain conditions. If an undistinguished record enters any one of the logic circuits $B_1$–$B_5$, and the memory whose output is to be compared with that record contains a record in addition to that output, the record (as it appears at the output of the corresponding one of the logic circuits $B_1$–$B_5$) is distinguished.

The sorting units in the sorter S are disabled during the output mode. Moreover, due to the connections of the sorting units in the sorter S, as shown in FIGURE 4, the records which enter the sorter when it is inhibited are not rearranged and appear in the same order at its output terminals. The logic circuits $C_1$–$C_5$ serve to detect a distinguished data output from any of the memories. If such an output enters one of the logic circuits $C_1$–$C_5$, the corresponding sorter $S_1'$–$S_5'$ is inhibited from exchanging its inputs.

The logic circuits $F_1$–$F_5$ serve to detect an undistinguished record output. If an undistinguished record output enters any one of the logic circuits $F_1$–$F_5$, and a record is in the memory A–E whose output is to be compared therewith, the corresponding logic circuit $F_1$–$F_5$ appends a distinction to its output.

A typical sorter circuit is shown in FIGURE 13. This sorter circuit is appropriate, for example, for the sorters $S_0$–$S_5$, for the sorters $S_1'$–$S_5'$, and for the individual units of the sorter S of FIGURES 2 and 4.

The particular sorting network shown in FIGURE 13 is similar to that disclosed in the aforesaid copending application Ser. No. 349,539, filed Mar. 3, 1964, in the name of the present inventor. However, other types of sorting networks, including one using a three-state memory (to be described), may be used.

The sorting network of FIGURE 13 includes a first input terminal A which receives, for example, a first record A; and it includes a second input terminal B which receives, for example, a second record B. The input terminal A is connected to an "and" gate 112 and to an inverter network 119. The input terminal B is connected to an "and" gate 113 and to an inverter network 120. The inverter network 119 responds in known manner to the input record A to produce its complement $\bar{A}$ on a bit-by-bit basis; and the inverter network 120 responds to the record B to produce its complement $\bar{B}$ on a bit-by-bit basis.

The inverter network 119 is connected to an "and" gate 121, and the inverter network 120 is connected to an "and" gate 122. The "and" gates 112 and 113 are connected to an "or" gate 114. The "or" gate 114 is connected to the output terminal designated "Hi." The "and" gates 121 and 123 are connected to an "or" gate 123. The "or" gate 123 is connected to an inverter network 125 which, in turn, is connected to the "Lo" output terminal.

The input terminal A and the output terminal of the inverter 120 are connected to an "and" gate 135. This means that the binary coded records A and $\bar{B}$ are introduced to the "and" gate 135. The input terminal B and the output of the inverter 119 are connected to an "and" gate 137. Therefore, the binary coded records B and $\bar{A}$ are applied to the "and" gate 137. Appropriate bit timing clock pulses derived from the storage medium 12, in the manner described above, are also applied to the "and" gates 135 and 137 for bit timing purposes.

The "and" gate 135 is connected to the set input terminal of an inhibit flip-flop $Q_1$. The "and" gate 137 is connected to the set input terminal of an exchange flip-flop $Q_3$. Prior to each input operation, reset pulses are applied to the input terminals of the flip-flops $Q_1$–$Q_3$ to reset the flip-flops.

The false output terminal $\bar{Q}_1$ of the inhibit flip-flop $Q_1$ is connected to the "and" gates 113 and 121, and also to the "and" gate 137. This false output terminal $\bar{Q}_1$ of the flip-flop applies the term $Q_1$ to the "and" gates 113, 121 and 137. The false output terminal $\bar{Q}_3$ of the exchange flip-flop $Q_3$ is connected to the "and" gates 112 and 122, and to the "and" gate 125. This output terminal of the exchange flip-flop applies the term $\bar{Q}_3$ to the "and" gates 112, 122 and 135.

As noted above, in order for the system of FIGURE 4 to perform its sorting function, it is necessary for the records A and B to be applied to the sorting system in a bit-by-bit serial number, with the most significant bit of the identification field of each in the lead. At the commencement of the sorting operation, both the inhibit flip-flop $Q_1$ and the exchange flip-flop $Q_3$ are reset, so that both the terms $\bar{Q}_1$ and $\bar{Q}_3$ are false. Therefore, at the beginning of the operation, the "and" gates 112, 113, 121 and 122 are all enabled. The records A and B pass through the "and" gates on a serial bit-by-bit basis, so long as the corresponding bits of the two records are both either 1 or 0. These bits then appear unchanged, at the output terminals "Hi" and "Lo."

Assume that a bit in the identifying field of the record A is 0 at the time when the corresponding bit in the identifying field of the record B is a 1, and that this is the first instance that a condition of one record having a bit different than the corresponding bit of the other record has occurred, this means that the identifying signal of the record B represents a higher integer than the identifying signal of the record A. Under this condition, the term $\bar{A}.B$ is true, so that the "and" gate 137 is enabled. The next clock pulse CL sets the exchange flip-flop $Q_3$, so that the "and" gates 112 and 122 are disabled. Also, the "and" gate 135 is disabled, so that no further triggering of either of the flip-flops $Q_1$ or $Q_3$ is possible during the particular comparison operation.

Following the detection of a 0 bit in the identifying field of the A record, and the simultaneous detection of a 1 bit in the identifying field of the B record, indicating that the B record is greater than the A record, the remaining bits of the control and data fields of the data record pass through the enabled "and" gate 122 in complemented ($\bar{A}$) form, and through the "or" gate 123 and the inverter 125 to the output terminal "Lo."

The corresponding bits of the remaining portions of the identifying signals and the bits in the data field of the B record pass through the enabled "and" gates 113 and 114 to the output terminal "Hi." Therefore, the detection of inequality between the identifying signals in the identifying fields of the A records causes the lower A record to appear at the output terminal "Lo" and the higher B record to appear at the output terminal "Hi."

Conversely, should the comparison described above reach a point at which the identifying signal of the A record has a 1 bit at the time when the identifying signal of the B record has a 0 bit indicating that the A record is greater than the B record, the term $A.\bar{B}$ is applied to the "and" gate 135 to enable the "and" gate, so that the next clock pulse sets the inhibit flip-flop $Q_1$.

This setting of the inhibit flip-flop $Q_1$ causes the "and" gates 113 and 121 to become disabled, and also causes the "and" gate to become disabled. The disabling of the "and" gate 137 prevents any setting of the exchange flip-flop 123 during the remaining portion of the comparison process for the particular records under consideration.

Under the latter set of conditions, the greater record A is passed through the "and" gate 112 and through the "or" gate 114 to the "Hi" output terminal; whereas, the lower record B is passed through the inverter 120, through the "and" gate 122, and through the "or" gate 123 to the inverter 125. This latter record B is reinverted to the inverter 125, and it appears at the "Lo" output terminal in its original form.

As noted above, the sorting network of FIGURE 13 can be used for the sort units $S_0$–$S_5$ and $S_1'$–$S_5'$ and for the units making up the sorter S. As also mentioned, the particular sorter shown in FIGURE 13 can be replaced by a simpler version using a three-state memory device, as shown in FIGURE 14.

Figure 14:
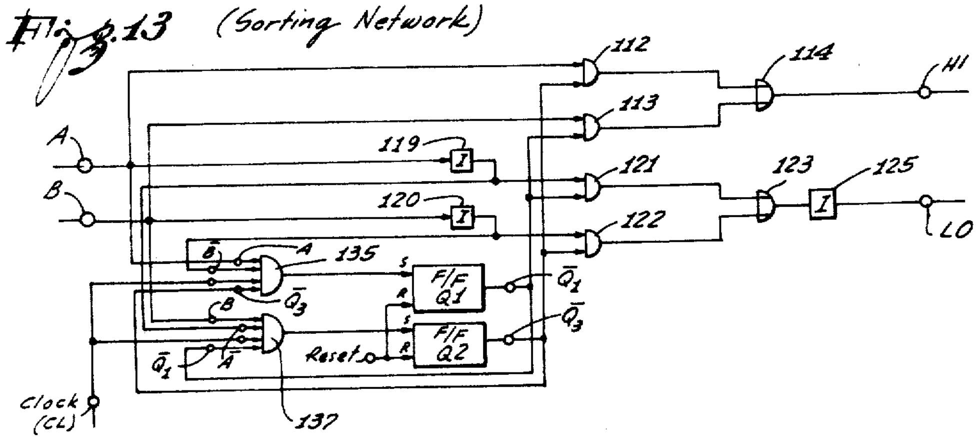

As shown in FIGURE 14, the three-state memory device is designated $S_1$, $S_2$, $S_3$. This device may be of the type described, for example, in Jagger Patent 3,012,155 which issued Dec. 5, 1961; and which also is described at page 151 et seq. of a text book entitled, "Functional Circuits and Oscillators"—Reich, published by Van Nostrand Company, Inc., in 1961.

The three-state memory device initially produces three false outputs. At the beginning of the sorting process, a set signal is applied to the input of the portion $S_1$, so that the output of the three-state device becomes $S_1.\bar{S}_2.\bar{S}_3$. The three-state device remains in that state, until inputs are applied to either the portion $S_2$ or $S_3$. Should an input be applied to the portion $S_2$, the three-state device assumes the state $\bar{S}_1.S_2.\bar{S}_3$. The three-state device remains in that state until the end of the process. Conversely, should an input be applied to the portion $S_3$, the device assumes the state $\bar{S}_1.\bar{S}_2.\bar{S}_3$ which combines until the end of the process.

The three-state device is used in the circuit of FIGURE 4 in a manner such that if the two records input to the circuit are the same, the three-state device remains in the state $S_1.\bar{S}_2.\bar{S}_3$. However, if the A record is greater than the B record, the three-state device is set to the state $\bar{S}_1.S_2.\bar{S}_3$, as soon as the bit differentiation is sensed between the two records. Conversely, should the B record be greater than the A record, the three-state device is set to the state $\bar{S}_1.\bar{S}_2.S_3$, in which it remains for the remainder of the sorting process.

The two input records A and B are introduced to an "or" gate 200 and to an "and" gate 202. The "or" gate 200 applies the term $A+B$ to an "and" gate 204. The "and" gate 202 is coupled through an inverter 206 to a pair of "and" gates 208 and 210. The term $\overline{A.B}$ is introduced, therefore, to the "and" gates 208 and 210. The input A is also introduced to an "and" gate 212 and to an "and" gate 214, whereas the input B is introduced to an "and" gate 216 and to an "and" gate 218. The term $A.B$ from the "and" gate 202 is applied to an "and" gate 220.

The output $S_1$ is introduced to the "and" gates 204 and 220, the output $S_2$ is introduced to the "and" gates 212 and 218, and the output $S_3$ is introduced to the "and" gates 216 and 214. The "and" gates 204, 212 and 216 are connected to an "or" gate 230 which, in turn, is connected to the "Hi" output terminal. The "and" gates 214, 218 and 220 are connected to an "or" gate 232 which, in turn, is connected to the "Lo" output terminal. The "and" gate 208 is connected to the input terminal of the $S_2$ portion of the three-state device, whereas the "and" gate 210 is connected to the $S_3$ portion.

It will be appreciated that at the beginning of the sorting process, the three-state device enables the "and" gates 204 and 220. Then, so long as the input records are the same, on the bit-by-bit comparison basis, from the most significant bit, the corresponding 1 or 0 bits pass to the "Hi" and "Lo" output terminals.

Now, assuming that the record A is greater than the record B, when the bit time is reached wherein the record A exhibits a unity bit, and the record B exhibits a zero bit, the "and" gates 208 and 210 are both enabled. However, since in this instance the A record exhibited the unity bit, that bit is passed by the "and" gate 208 so as to set the portion $S_2$ of the three-state memory device. This causes the A record to pass to the "Hi" output terminal through the "and" gate 212, and it causes the B record to pass to the "Lo" output terminal through the "and" gate 218.

Conversely, should the B record be greater than the A record, the unity bit of the B record is passed by the "and" gate 210 to set the portion $S_3$ of the 3-state memory device. This causes the "and" gates 214 and 216 to be enabled, so that the B record is passed to the Hi output terminal, whereas the A record is passed to the Lo output terminal.

Figure 16:
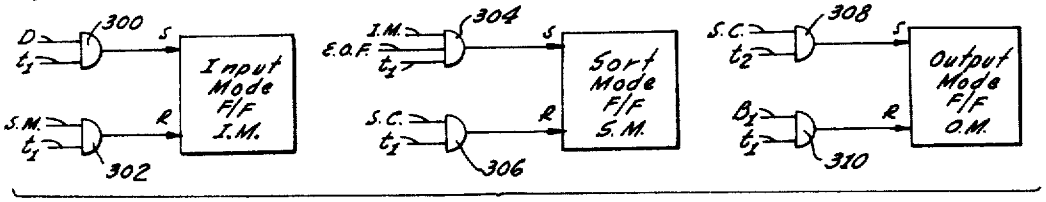
FIGURE 16 shows the logic associated with certain mode control flip-flops.
Figure 17:
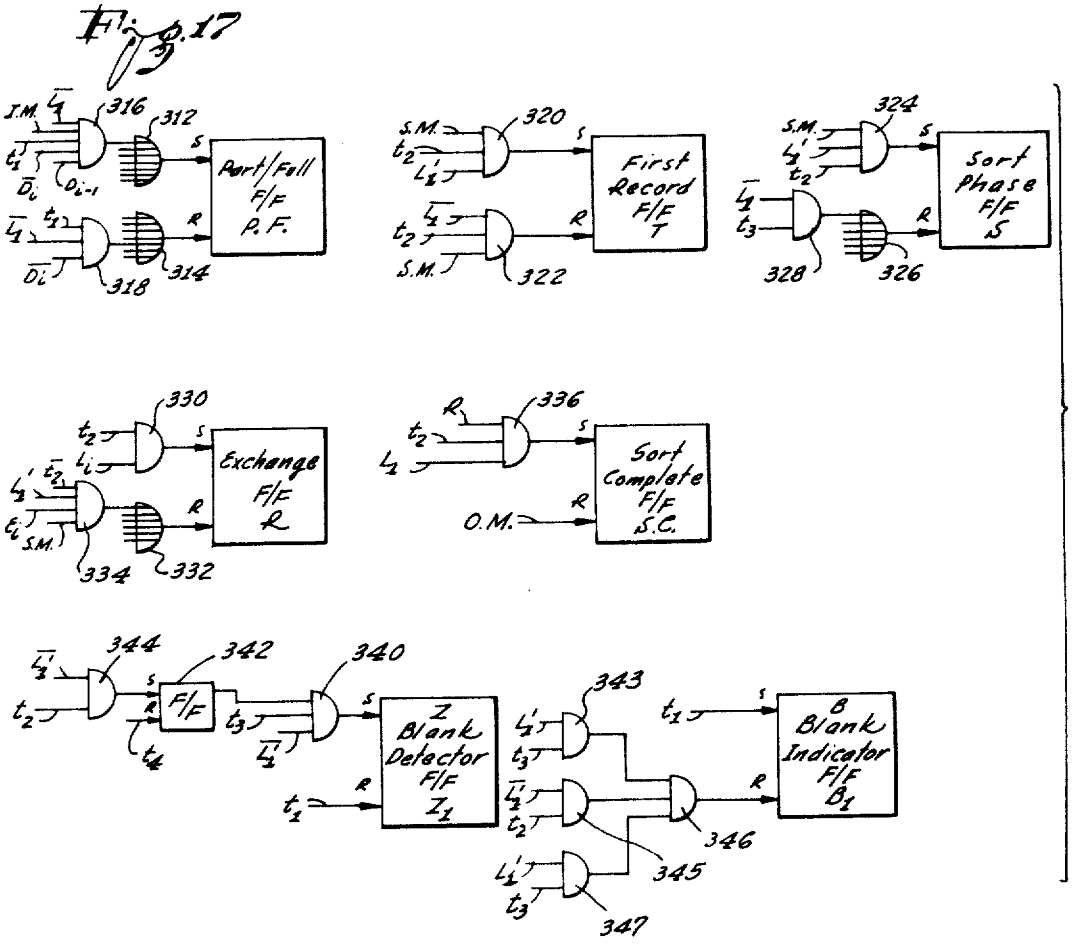
FIGURE 17 illustrates the logic associated with the other control flip-flops used in the system of the invention.
Figure 18:
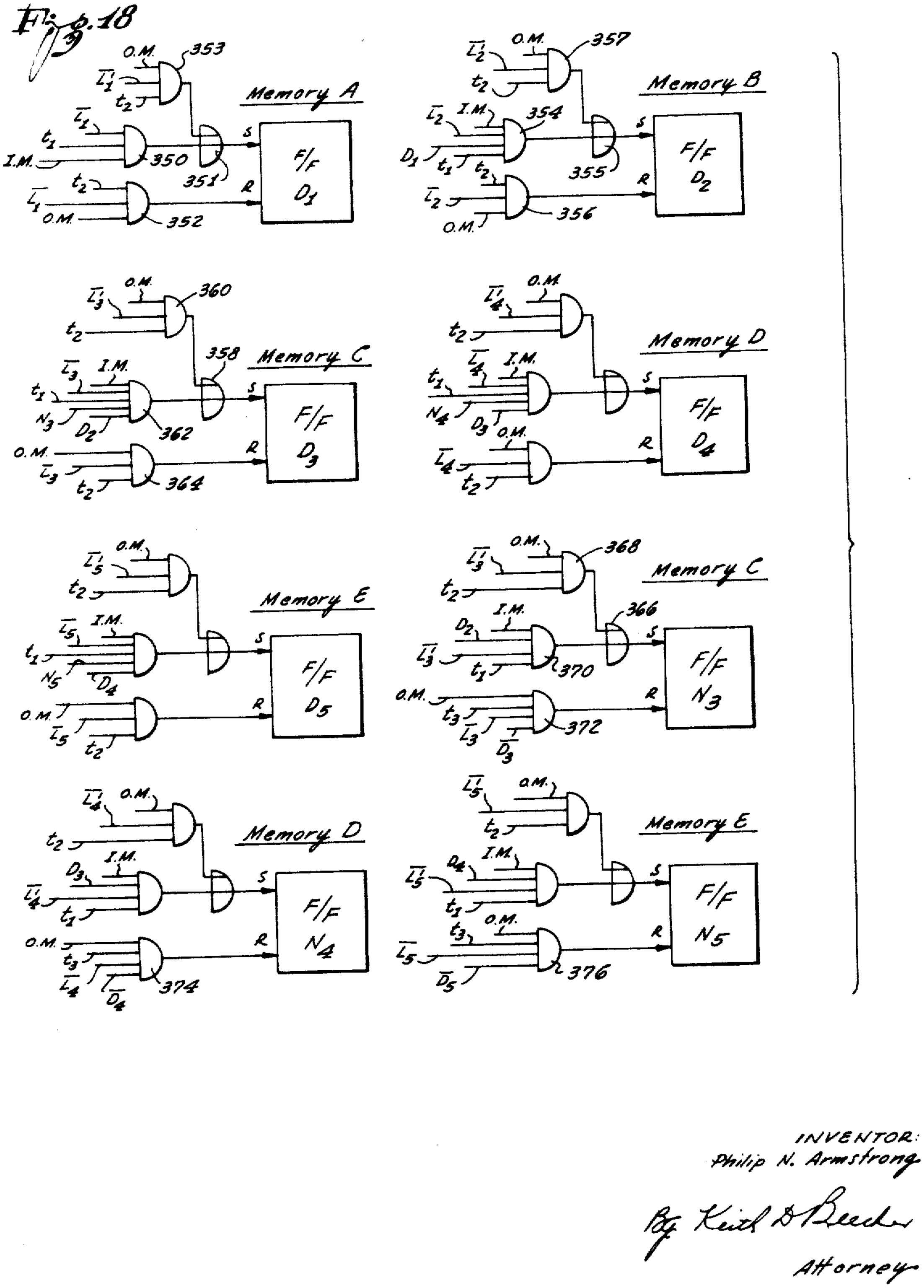
FIGURE 18 is a logic circuit block diagram showing the various flip-flops used to indicate when the different memories are empty, partially filled, or filled with records.

The system of the invention is controlled by a plurality of flip-flops which are shown in FIGURES 16, 17 and 18. These flip-flops, and other logic circuit components to be described are under the control of the bit timing pulses $t_1$, $t_2$, $t_3$ . . . described above.

Due to the time required for the records and blanks to pass through the system, the bit timing pulses must also be suitably delayed by like amounts prior to their being applied to the logic circuits $A_1$–$A_5$, $B_1$–$B_5$, $C_1$–$C_5$, and $F_1$–$F_5$, so that the proper timing may be maintained.

Figure 15:
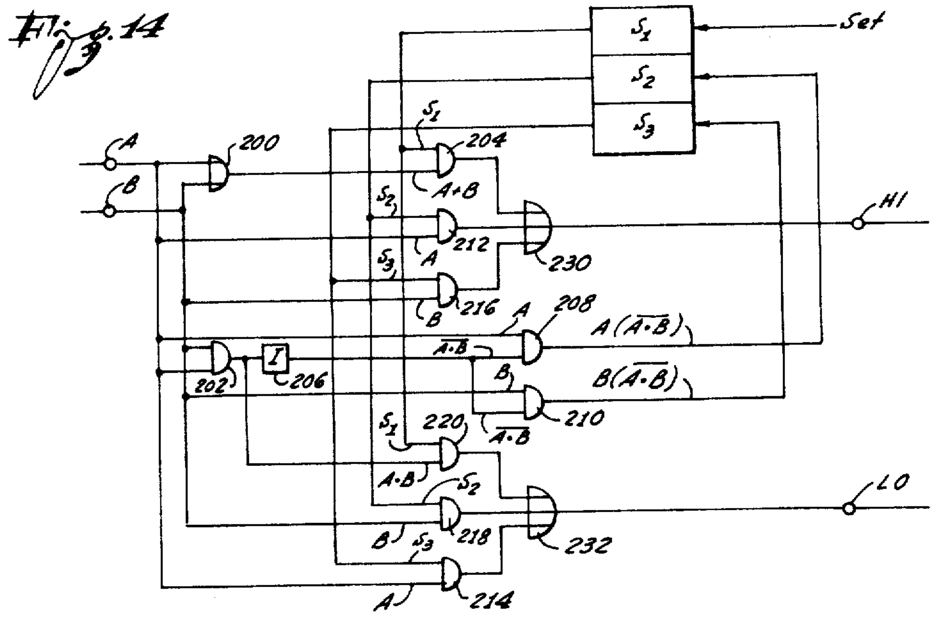
FIGURE 15 is a table illustrating various control bits for the different words used in the sorting system.

For convenience, the bit timing of the control field bits of the different records and blanks is shown in FIGURE 15.

The flip-flops involved in the system are as follows:

Input Mode (I.M.) (FIGURE 16)—Indicates the Input Mode;

Data Input (D) (not illustrated)—Controlled by the System Introducing Records to the sorter;

Part Full (P.F.) (FIGURE 17)—Indicates when any Memory in the System has a Data Input with a B** Output;

Sort Mode (S.M.) (FIGURE 16)—Indicates the Sort Mode;

First Record In Pass (T) (FIGURE 17)—Detects the D+ Record during the Sort Mode;

Sort Phase Indicator (S) (FIGURE 17)—Indicates Phases During Sort Mode;

Exchange Indicator (R) (FIGURE 17)—Detects Exchanges in Sorters during each Pass of Sort Mode;

Sort Complete (S.C.) (FIGURE 17)—Indicates the Completion of the Sort Mode;

Z Blank Detector ($Z_1$) (FIGURE 17)—Detects Presence of Z Blanks in Memory A;

B Blank Detector ($B_1$) (FIGURE 17)—Detects Blanks in Memory A to Indicate Completion of Output Mode;

Output Mode (O.M.) (FIGURE 16)—Indicates Output Mode;

Data Indicator ($N_3$–$N_5$) (one for each memory except A and B) (FIGURE 18)—Indicates that a Record has been Introduced to the Corresponding Memory;

Memory Fill Indicator ($D_1$–$D_5$) (one for each memory) (FIGURE 18)—Indicates that the corresponding Memory is full of Records, by detecting a record at the output of the Memory; and during Output Mode it indicates the presence of an Undistinguished Record in the Corresponding Memory.

As shown in FIGURE 16, the input mode flip-flop I.M. has an "and" gate 300 connected to its set input terminal, and an "and" gate 302 connected to its reset input terminal. The terms D and $t_1$ are introduced to the "and" gate 300, and the terms S.M. and $t_1$ are introduced to the "and" gate 302. This means that the input mode flip-flop I.M. is set during the beginning of the input mode, under an appropriate command from the system applying the record to the sorter which sets the aforementioned flip-flop D. The input mode is terminated, and the flip-flop I.M. is thereby reset, when the sort mode flip-flop S.M. is set.

The sort mode flip-flop S.M. has an "and" gate 304 connected to its set input terminal, and an "and" gate 306 connected to its reset input terminal. The terms I.M., E.O.F. and $t_1$ are introduced to the "and" gate 304; and the terms S.C. and $t_1$ are introduced to the "and" gate 306. This means that the sort mode flip-flop S.M. is set, so as to establish the system in its sort mode, upon the receipt of an "End Of File" (E.O.F.) command from the system feeding the records to the sorter, and assuming that the sorter is in its input mode (I.M.). This sort mode flip-flop S.M. remains set during the sort mode, and until the sort is complete, as indicated by the "sort complete" flip-flop S.C. being set. This causes the sort mode flip-flop S.M. to be reset.

The output mode flip-flop (O.M.) includes an "and" gate 308 connected to its set input terminal, and an "and" gate 310 is connected to its reset input terminal. The terms S.C. and $t_2$ are applied to the "and" gate 308, and the terms $B_1$ and $t_1$ are applied to the "and" gate 310. The output mode is initiated, when the output mode flip-flop O.M. is set, this being achieved when the "sort complete" flip-flop S.C. is set. The output mode then continues until a blank is detected in the least memory A, as indicated by the setting of the blank indicator flip-flop $B_1$.

The "part full" flip-flop (P.F.) shown in FIGURE 17 includes an "or" gate 312 connected to its set input terminal, and an "or" gate 314 is connected to its reset input terminal. A plurality of "and" gates, such as the "and" gate 316, are connected to the "or" gate 312, and a plurality of "and" gates, such as the "and" gate 318, are connected to the "or" gate 314. It will be appreciated that an "and" gate (such as the "and" gate 316) for each of the memories A–E will be connected to the "or" gate 312, and that an "and" gate (such as the "and" gate 318)

for each of the memories will be connected to the "or" gate 314.

The terms $\overline{L_1}'$, I.M., $t_1$, $\overline{D_i}$, and $D_{i-1}$ are applied to the "and" gate 316. The "*i*" subscripts refer the corresponding terms generally to any one of the memories A–E. It will be appreciated, therefore, that whenever the $t_1$ term of a word input to any one of the memories is a 0, and when the $D_i$ flip-flop (to be described in conjunction with FIGURE 18) associated with that memory is false, and the $D_i$ flip-flop associated with the next lower memory ($D_{i-1}$) is true (these flip-flops indicating respectively that the preceding memory is full but that the corresponding memory is not full), then the "part full" flip-flop P.F. is set, because the indication is that there is a partially filled memory in the system.

Conversely, whenever the $t_1$ bit of the output ($L_i$) from any memory is a 0, and the $\overline{D_i}$ indication is that the memory is not full, then the indication is that the corresponding memory has become empty, so that the part full flip-flop (P.F.) is reset.

The "first record" flip-flop T is shown in FIGURE 17, and this flip-flop controls the markings as D+ of the first record in phase II of the sort mode. An "and" gate 320 connected to the set input terminal, and "and" gate 322 connected to the reset input terminal of the flip-flop. The terms S.M., $L_1'$ and $t_2$ are applied to the "and" gate 320; and the terms $\overline{L_i}$, S.M., and $t_2$ are applied to the "and" gate 322.

The sort phase flip-flop S includes an "and" gate 324 connected to its set input terminal, and an "or" gate 326 connected to its reset input terminal. The terms S.M., $L_1'$ and $t_2$ are applied to the "and" gate 324. The terms $\overline{L_i}$ and $t_3$ are applied to an "and" gate 328, and a plurality of similar "and" gates are connected to the "or" gate 326. This means that whenever a blank or distinguished record ($L_1'.t_2$) is input to the memory A during a sort mode, the sort phase flip-flop S is set. Likewise, whenever a B blank or D+ record is output from any of the memories, the sort phase flip-flop is reset.

The exchange flip-flop R includes an "and" gate 330 connected to its set input terminal, and an "or" gate 332 connected to its reset input terminal. The exchange flip-flop is set by any blank or distinguished record, due to the terms $L_1$ and $\overline{t_2}$ applied to the "and" gate 330. Then, the terms $L_1'$, S.M., $t_2$ and $E_i$ applied to an "and" gate 334, a plurality of which (one for each sorter) are connected to the "or" gates 332, cause the exchange flip-flop R to be reset, should an exchange take place in any of the sorters.

Should no exchange take place, the exchange flip-flop remains set during the first phase of the sort mode, so that the first distinguished record out of the memory A sets the "sort complete" flip-flop S.C. This is due to the terms R, $t_2$ and $L_1$ being applied to an "and" gate 336, which is connected to the set input terminal of the "sort complete" flip-flop S.C. The term O.M. is applied to the reset terminal of the S.C. flip-flop, and this term causes the flip-flop S.C. to be reset, when the output mode is initiated.

The $Z_1$ flip-flop is used to detect Z blanks in the memory A, so that these blanks will not be distinguished during the input mode. The $Z_1$ flip-flop includes an "and" gate 340 connected to its set input terminal. The set output terminal of a flip-flop 342 is connected to the "and" gate 340; and the terms $t_3$ and $\overline{L_1}'$ are applied to the "and" gate. An "and" gate 344 is connected to the set input terminal of the flip-flop 342; and the terms $\overline{L_1}'$ and $t_2$ are applied to the "and" gate 344. The term $t_4$ resets the flip-flop 342, and the term $t_1$ resets the flip-flop $Z_1$.

The presence of a "Z" blank input to the "A" memory sets the flip-flop 342 to enable the "and" gate 340 and thereby permit the $Z_1$ flip-flop to be set.

The B blank flip-flop $B_1$ detects B blanks in the least memory $L_1$. This flip-flop is set each $t_1$ time, by the term $t_1$ applied to its set input terminal. An "or" gate 346 is connected to its reset input terminal, and "and" gates 343, 345 and 347 are connected to its reset input terminal. The terms $L_1'$ and $t_3$ are applied to the "and" gate 343; the terms $\overline{L_1}'$ and $t_2$ are applied to the "and" gate 345, and the terms $L_1'$ and $t_3$ are applied to the "and" gate 347.

It is evident that the flip-flop B will remain set only if a B blank is inputed to the memory A.

A somewhat simplified set of logic equations may be developed for the flip-flops discussed above, and these are as follows:

(a) Part Full Flip-Flop (P.F.) indicates when any memory (A–E) contains one or more record words and a B** word in the Input Mode.

$$_1PF=Ni.\overline{Di}.t_{2F}$$
$$_0PF=\overline{OM}.Ni.Li.t_{1A}$$
$$(3\leqq i\leqq 17)$$

(b) Sort Phase Indicator Flip-Flop (S). This flip-flop is set in the Sort Phase II, and it is reset in the Sort Phase I.

$$_1S=SM.L_1'.t_{2F}$$
$$_0S=SM.Li.L_{i-rc}.t_{2A}$$
$$(2\leqq i\leqq 17)$$

(c) Sort Complete Flip-Flop (SC). Set at the end of the sort pass (end of Phase I) when the file is found in order.

$$_1SC=L_1'.t_{2F}.T.\overline{S}.\overline{R}$$
$$_0SC=Sm.t_{2A}$$

(d) Sort Cycle Indicator Flip-Flop (T). Used to inhibit sort complete apparatus at least until one pass is completed.

$$_1T=SM.L_1'.t_{2F}$$
$$_0T=IM.D_1.t_{1A}+SC.t_{3F}$$

(e) Sort Pass Indicator Flip-Flop (R). This flip-flop is set during the Sort Mode if at any record time it is found that another pass must be made. It is reset at the end of each pass in the Sort Mode.

$$_1R=SM.E_i$$
$$(3\leqq i\leqq 17)$$
$$_0R=SM.L_1'.t_{2F}$$

(f) Zero Indicator Flip-Flop ($Z_1$). Indicates the presence of $Z_1$ blanks in the memory.

$$_1Z_1=t_{3F}$$
$$_0Z_1=L_1'\cdot\overline{t_{1F}}\cdot\overline{t_{2F}}\cdot\overline{t_{3F}}$$

(g) Blank Indicator Flip-Flop (B). Detects B blanks going into the $L_1$ memory so as to indicate the end of the Output Mode.

$$_1B=OM\cdot L_1'\cdot t_{3F}$$
$$_0B=\overline{OM}$$

It will be understood that $t_{1A}$, $t_{2A}$, etc., represent the corresponding bit timing pulses as they occur in the $A_i$ logic networks; $t_{1F}$, $t_{2F}$, etc., represent the bit timing pulses as they occur in the $F_i$ logic circuits.

The term $L_{i-RC}$ is a memory output picked up ahead of the preceding re-clocking flip-flop.

As mentioned above, each of the memories A–E includes a $D_i$ flip-flop, and the memories C–E each includes an $N_i$ flip-flop. When both the $N_i$ and $D_i$ flip-flops are false, the corresponding memory is empty. When the flip-flop $N_i$ is set, it means that the corresponding memory is partially full. Then, when both the $N_i$ and $D_i$ flip-flops are set, it means that the corresponding memory is full of records. Also, as mentioned above, the flip-flops $N_i$ and $D_i$ are used to indicate the presence of undistinguished records in the output mode.

As shown in FIGURE 18, the flip-flop $D_1$ is associated with the memory A, and the flip-flop $D_2$ is associated with the memory B. Since the memories A and B are "one word" memories, there is no need for the part full flip-flop $N_1$ in conjunction with these memories. The flip-flops $D_3$ and $N_3$ are associated with the memory C; the flip-flops $D_4$ and $N_4$ are associated with the memory D; and the flip-flops $D_5$ and $N_5$ are associated with the memory E.

An "and" gate 350 is connected through an "or" gate 351 to the set input terminal of the flip-flop $D_1$; and an "and" gate 352 is connected to the reset input terminal. An "and" gate 353 connected to the "or" gate 351. The terms O.M., $\overline{L_1}'$ and $t_2$ are applied to the "and" gate 353. The terms I.M., $\overline{L_1}$ and $t_1$ are introduced to the "and" gate 350; and the terms O.M. $\overline{L_1}$ and $t_2$ are introduced to the "and" gate 352. This means that whenever a record is outputted from the memory A during the input mode, the terms $\overline{L_1}$, $t_1$ set the flip-flop $D_1$. Conversely, whenever an undistinguished record is outputted from the memory A during the output mode, the terms $\overline{L_1}$, $t_2$ reset the flip-flop $D_1$.

As mentioned above, since the memories A and B are one word memories, there is no need for $N_1$ flip-flops associated with those memories. In the case of the memories A and B, the $D_1$ flip-flop, when set during the input mode, indicates that the corresponding memory A or B is full, and when reset, indicates that the corresponding memory A or B is empty.

An "and" gate 354 is connected through an "or" gate 355 to the set input terminal of the flip-flop $D_2$, and an "and" gate 356 is connected to the reset input terminal. An "and" gate 357 is connected to the "or" gate 355. The terms O.M., $\overline{L_1}'$ and $t_2$ are applied to the "and" gate 357. The terms I.M., $\overline{L_2}$, $D_1$ and $t_1$ are applied to the "and" gate 354; and the terms O.M., $\overline{L_2}$ and $t_2$ are applied to the "and" gate 356. This means that whenever a record D is outputted from the memory B during the input mode, the term $\overline{L_2}\cdot t_1$ sets the flip-flop D, whereas whenever an undistinguished record is outputted from the memory B during the output mode, the term $\overline{L_2}\cdot t_2$ resets the flip-flop $D_2$.

With respect to the flip-flop $D_3$, an "or" gate 358 is connected to its set input terminal, and a pair of "and" gates 360 and 362 are connected to the "or" gate 358. An "and" gate 364 is connected to the reset input terminal of the flip-flop $D_3$. The terms O.M., $\overline{L_3}'$ and $t_2$ are applied to the "and" gate 360; whereas the terms I.M., $\overline{L_3}$, $t_1$, $N_3$ and $D_2$ are applied to the "and" gate 362. The terms O.M., $\overline{L_3}$ and $t_2$ are applied to the "and" gate 364.

The flip-flop $D_3$ is set, by way of the "and" gate 362, during the input mode, and whenever a record D is derived from the memory C, indicating that the memory C is full of records. Also, the "and" gate 360 is enabled during the output mode, when an undistinguished record is fed into the memory C, so as to set the flip-flop $D_3$.

The flip-flop $N_3$, associated with the memory C, includes an "or" gate 366 connected to its set input terminal, and a pair of "and" gates 368 and 370 connected to the "or" gate. An "and" gate 372 is connected to the reset input terminal of that flip-flop. The terms O.M., $\overline{L_3}'$ and $t_2$ are applied to the "and" gate 368; the terms I.M., $D_2$, $\overline{L_3}'$ and $t_1$ are applied to the "and" gate 370; and the terms O.M., $t_3$, $\overline{L_3}$ and $\overline{D_3}$ are applied to the "and" gate 372.

Therefore, the flip-flop $N_3$ is set during the input mode, assuming that the flip-flop $D_2$ of the memory D has been set to indicate that the memory B is full (a condition which must be fulfilled before the memory C can be partially filled) and the inputing of a D record into the memory C, causes the "and" gate 370 to become enabled, so as to set the flip-flop $N_3$ to indicate that the memory C does have data in it. It will be remembered that when the flip-flop $N_3$ is set, and the flip-flop $D_3$ is reset, the indication is that the memory C is partially filled with records. The flip-flop $D_3$ is also set when the memory C is full of records. Whenever an undistinguished record is introduced to the memory C during the output mode, the gate 368 is enabled, so as to set the flip-flop $N_3$.

It will be appreciated that the flip-flops $D_4$ and $N_4$ associated with the memory D have similar logic associated with them as that described above in conjunction with the flip-flops $D_3$ and $N_3$. It will also be appreciated that the flip-flops $D_5$ and $N_5$ associated with the memory E, also have similar logic associated with them as the logic associated with the flip-flops $D_4$, $N_4$ and $D_3$, $N_3$. In each instance, and as mentioned above, the $D_1$ and $N_1$ flip-flops associated with the memories C, D and E indicate an empty condition $(\overline{D_1}\cdot\overline{N_1})$, a partially filled condition $(\overline{D_1}\cdot N_1)$, and a filled condition $(D_1\cdot N_1)$, of corresponding memory.

Figure 19:
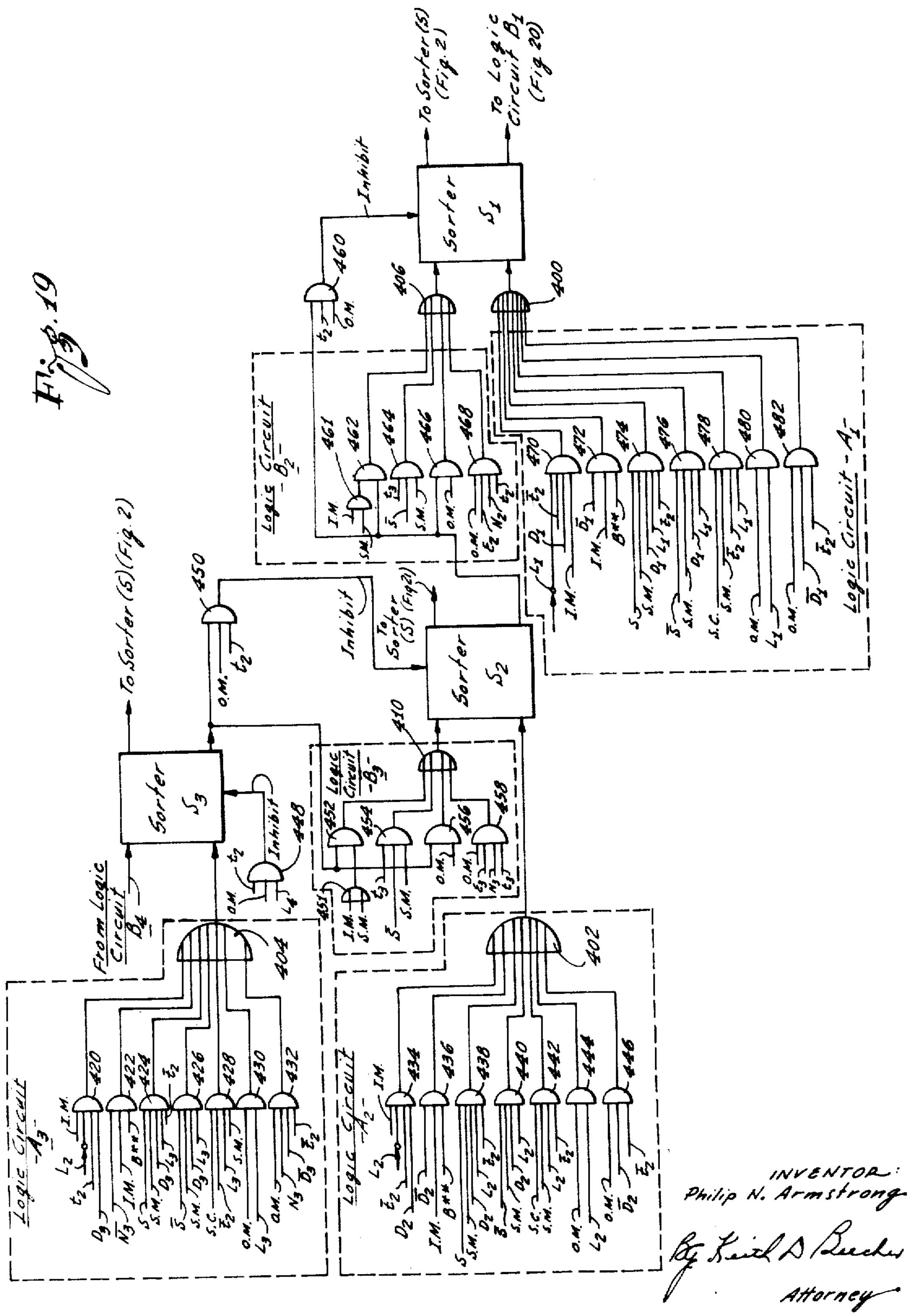
FIGURE 19 is a diagram showing the logic associated with certain ones of the sorters.
Figure 20:
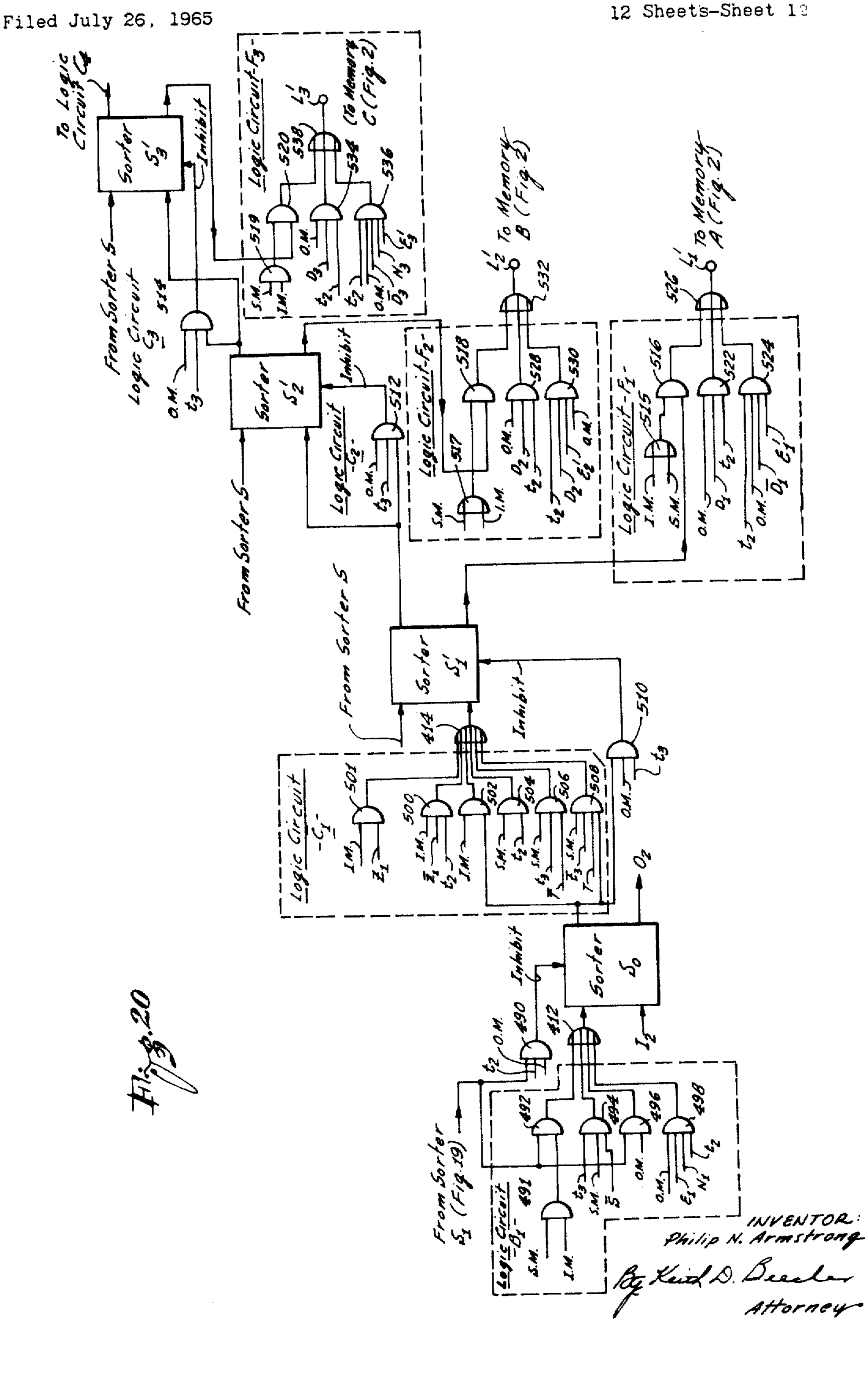
FIGURE 20 is a diagram showing the logic associated with other sorters in the system.

The logic diagrams of FIGURES 19 and 20 show the sorters $S_1$, $S_2$, $S_3$; and $S_0$, $S_1'$, $S_2'$ and $S_3'$ respectively; and these diagrams also show the logic circuits $A_1$, $A_2$ and $A_3$; $B_1$, $B_2$ and $B_3$; $C_1$, $C_2$, $C_3$; and $F_1$, $F_2$, $F_3$.

It will be appreciated that similar logic circuitry is associated with the sorters $S_4$ and $S_5$, and with the sorters $S_3'$, $S_4'$ and $S_5'$, as described in logic equations to be presented subsequently herein. The latter logic circuits, being largely repetitive, have been omitted merely for purposes of clarity.

The sorters $S_1$, $S_2$ and $S_3$ (FIGURE 19) have a first set of "or" gates 400, 402 and 404 respectively connected to their respective lower input terminals. These "or" gates are respectively included in the logic circuits $A_1$, $A_2$ and $A_3$. The sorters $S_1$ and $S_2$ have respective "or" gates 406 and 410 connected to their respective upper input terminals, the latter "or" gate being respectively included in the logic circuits $B_2$ and $B_3$. Likewise, the sorter $S_0$ (FIGURE 20) has an "or" gate 412 connected to its upper input terminal, the latter "or" gate included in the logic circuit $B_1$.

Also in FIGURE 20, the sorter $S_1'$ has an "or" gate 414 connected to its lower input terminal, the latter "or" gate being included in the logic circuit $C_1$.

Reverting to FIGURE 19, a plurality of "and" gates 420, 422, 424, 426, 428, 430 and 432 are connected to the "or" gate 404. The terms I.M., $\overline{t_2}$ and $D_3$ are introduced to the "and" gate 420, together with the output from the memory C ($L_3$). The terms $\overline{N_3}$, I.M. and B are applied to the "and" gate 422. The terms S., S.M., $D_3$, $L_3$ and $\overline{t_2}$ are applied to the "and" gate 424. The terms $\overline{S}$, S.M., $D_3$ and $L_3$ are applied to the "and" gate 426. The terms S.C., $\overline{t_2}$, $L_3$ and S.M. are applied to the "and" gate 428. The terms O.M. and $L_3$ are applied to the "and" gate 430. Finally, the terms O.M., $N_3$, $\overline{D_3}$ and $\overline{t_2}$ are applied to the "and" gate 432**.

Likewise, a plurality of "and" gates 434, 436, 438, 440, 442, 444 and 446 are connected to the "or" gate 402.

The terms I.M., $\overline{t_2}$ and $D_2$ are applied to the "and" gate 434, together with the output from the memory B ($L_2$). The terms $\overline{D_2}$, I.M. and B are applied to the "and" gate 436. The terms S, S.M., $D_2$, $L_2$ and $\overline{t_2}$ are applied to the "and" gate 438. The terms $\overline{S}$, S.M., $D_2$ and $L_2$ are applied to the "and" gate 440. The terms S.C., S.M., $L_2$ and $\overline{t_2}$ are applied to the "and" gate 442. The terms O.M. and $L_2$ are applied to the "and" gate 444. The terms O.M., $\overline{D_2}$ and $\overline{t_2}$ are applied to the "and" gate 446**.

The sorter $S_3$ also has an "and" gate 448 included in the $B_4$ logic, and the terms $t_2$, O.M. and $L_4$ are introduced to that "and" gate. The "and" gate 448 applies its output to the sorter $S_3$, so as to inhibit the operation of the sorter when the "and" gate 448 is enabled. Likewise, the logic circuit $B_3$ includes an "and" gate 450 which responds to the output from the sorter $S_3$, as well as to the terms O.M. and $t_2$, to inhibit the operation of the sorter $S_2$.

A group of "and" gates 452, 454, 456, 458 is connected to the "or" gate 410. The output from the sorter $S_3$, together with the terms S.M. and I.M. are applied to the "and" gate 452. The terms S.M. and I.M. are applied to the "and" gate 452 through an "or" gate 451. These connections permit circulation through the $B_3$ logic during the sort and input modes. The terms $t_3$, $\overline{S}$ and S.M. are applied to the "and" gate 454. The output from the sorter $S_3$, together with the term O.M. is applied to the "and" gate 456. The terms O.M., $E_3$, $N_3$ and $t_2$ are applied to the "and" gate 458.

The logic circuit $B_2$ includes an "and" gate 460 which responds to the output from the sorter $S_2$, together with the terms $t_2$ and O.M. to inhibit the operation of the sorter $S_1$. A plurality of "and" gates 462, 464, 466 and 468, also included in the logic circuit $B_2$, are connected to the "or" gate 406. The output from the sorter $S_2$ is applied to the "and" gates 462 and 466. The terms S.M. and I.M. are also applied to the "and" gate 462 through an "or" gate 461; so as to preserve circulation through the $B_2$ logic during the input and sort modes. The terms $t_3$, $\overline{S}$ and S.M. are applied to the "and" gate 464. The term O.M. is also applied to the "and" gate 466. The terms O.M., $E_2$, $N_2$ and $t_2$ are applied to the "and" gate 468.

A plurality of "and" gates 470, 472, 474, 476, 478, 480 and 482 are connected to the "or" gate 400. The output from the memory A ($L_1$) is applied to the "and" gates 470, 474, 476, 478 and 480. The terms $\overline{t_2}$, $D_1$ and I.M. are applied to the "and" gate 470. The terms $\overline{D_1}$, I.M. and B are applied to the "and" gate 472. The terms S, S.M., $D_1$ and $\overline{t_2}$ are applied to the "and" gate 474. The terms $\overline{S}$, S.M. and $D_1$ are applied to the "and" gate 476. The terms S.C., S, and $\overline{t_2}$ are applied to the "and" gate 478. The term O.M. is applied to the "and" gate 480. Finally, the terms O.M., $\overline{D_1}$ and $t_2$ are applied to the "and" gate 482**.

The logic circuit $B_1$ in FIGURE 20 includes an "and" gate 490 which responds to the output of the sorter of FIGURE 19, to the terms $t_2$ and O.M. to inhibit the operation of the sorter $S_0$. A further plurality of "and" gates 494, 492, 496 and 498 are connected to the "or" gate 412. The output from the sorter $S_1$ of FIGURE 19 is also applied to the "and" gates 492 and 496. The terms S.M. and I.M. are applied through an "or" gate 491 to the "and" gate 492 to preserve circulation during the input and sort modes; whereas the term O.M. is applied to the "and" gate 496. The terms $t_3$, $\overline{S}$ and S.M. are applied to the "and" gate 494. The terms O.M., $E_1$, $N_1$ and $t_2$ are applied to the "and" gate 498.

The logic circuit $C_1$ includes a plurality of "and" gates 500, 501, 502, 504, 506 and 508 all connected to the "or" gate 414. The logic circuit also includes an inhibit "and" gate 510 for the sorter $S_1'$. The terms I.M., $\overline{Z}$ and $t_2$ are applied to the "and" gate 500. The terms I.M. and Z, are applied to the "and" gate 501. The output of the sorter $S_0$ is applied to the "and" gates 502 and 508. The term I.M. is applied to the "and" gate 502. The terms S.M. and $t_2$ are applied to the "and" gate 504. The terms S.M., $t_3$ and $\overline{T}$ are applied to the "and" gate 506. The terms S.M., $\overline{t_3}$ and T are applied to the "and" gate 508. The output of the sorter $S_0$, together with the terms O.M. and $t_3$ are applied to the "and" gate 510.

The output from the sorter $S_1'$ is applied directly to the lower input terminal of the sorter $S_2'$. The logic circuit $C_2$ includes an "and" gate 512 which responds to the output from the sorter $S_1'$, together with the terms O.M. and $t_3$ to inhibit the operation of the sorter $S_2'$. Likewise, the output from the sorter $S_2'$ is connected to the input of the sorter $S_3'$, as shown. The logic circuit $C_3$ includes an inhibit "and" gate 514 which responds to the aforesaid output, together with the terms O.M. and $t_3$ to inhibit the operation of the sorter $S_3'$.

The lower output terminal from the sorter $S_1'$ is connected to an "and" gate 516 in the logic circuit $F_1$. Likewise, the lower output terminal of the sorter $S_2'$ is connected to an "and" gate 518 in the logic circuit $F_2$; whereas the lower output terminal of the sorter $S_3'$ is connected to an "and" gate 520 in the logic circuit $F_3$. The "and" gate 516, together with a pair of "and" gates 522 and 524 are connected to an "or" gate 526 in the logic circuit $F_1$, the output of which provides the $L_1'$ input to the memory A of FIGURE 2.

Likewise, the "and" gate 518, together with a pair of "and" gates 528 and 530 are connected to an "or" gate 532 in the logic circuit $F_2$, the output of which is connected to an output terminal $L_2'$ which supplies the input to the memory B of FIGURE 2. In like manner, the "and" gate 520, together with a pair of "and" gates 534 and 536, are connected to an "or" gate 538. The output of the "or" gate 538 provides the $L_3'$ signal to the input of the memory C of FIGURE 2.

The terms I.M. and S.M. are applied through an "or" gate 517 to the "and" gate 516 to preserve circulation in the input and sort modes. The terms O.M., $D_1$ and $t_2$ are applied to the "and" gate 522. The terms $t_2$, O.M., $\overline{D_1}$ and $E_1'$ are applied to the "and" gate 524. The terms I.M. and S.M. are applied through an "or" gate 517 to the "and" gate 518 in the logic circuit $F_2$ to preserve circulation in the input and sort modes. The terms O.M., $D_2$ and $t_2$ are applied to the "and" gate 528. The terms $t_2$, $D_2$, $E_2'$ and O.M. are applied to the "and" gate 530. Finally, the terms I.M. and S.M. are applied through an "or" gate 519 to the "and" gate 520 in the logic circuit $F_3$ to preserve circulation in the input and sort modes. The terms O.M., $D_3$ and $t_2$ are applied to the "and" gate 534. The terms $t_2$, O.M., $\overline{D_3}$, $N_3$ and $E_3'$ are applied to the "and" gate 536.

During the input mode, the flip-flop I.M. (FIGURE 15) is set. As mentioned above, the logic circuits $A_1$–$A_5$ (FIGURE 2) perform a variety of functions during the input mode. For example, these logic circuits supply B blanks to the system whenever the corresponding ones of the memories A–E are empty. This latter function is achieved, for example, by the logic circuits $A_1$, $A_2$ and $A_3$ in FIGURE 19 by means of the respective "and" gates 472, 436 and 422. In the case of the "and" gates 472 and 436, which are associated with the one-word memories A and B respectively; whenever the $D_1$ flip-flop is reset during the input mode, the "and" gate 472 passes B blanks to the system; and whenever the $D_2$ flip-flop is reset during the input mode, the "and" gate 436 passes B blanks to the system. In the case of the "and" gate 422, however, which is associated with a multi-word memory C, it passes B blanks to the system during the input mode when the corresponding "partially full" flip-flop $N_3$ is reset.

It will also be remembered that the logic circuits $A_1$–$A_5$ also function during the input mode to remove the distinctions (*) from any distinguished record. This is accomplished, for example, in the case of the logic circuits $A_1$–$A_3$ in FIGURE 19, by the "and" gates 470, 434 and 420. If the corresponding memory A, B or C is outputting a record, the corresponding flip-flop $D_1$, $D_2$ or $D_3$ will be set. Also, if that record is distinguished, the $t_2$ bit will be a 1 (FIGURE 15). The above mentioned "and" gates are disabled at $t_2$ bit time so that the $t_2$ bit will be returned to 0, if the record had been distinguished.

The logic circuits $B_1$–$B_5$ (FIGURE 2) serve no function during the input mode. Also, the logic circuits $C_2$–$C_5$ (FIGURE 3) serve no function during the input mode. However, the logic circuit $C_1$ distinguishes the data ($L_1'$) inputed to the memory A, but does not change the Z blanks so inputed. This function is carried out by the "and" gate 500 (FIGURE 20). So long as the word applied to the "and" gate 500 is not a Z blank, this "and" gate will cause the $t_2$ bit to be a 1 during the input mode. If the word *is* a Z blank, circulation is provided through the "and" gate 501. This, as shown in the table of FIGURE 15, will change a D record into a D* record.

As shown by the logic circuits of FIGURES 17 and 18, a corresponding one of the "partially full" flip-flops $N_3$–$N_5$ is set, whenever a corresponding one of $F_3$–$F_5$ logic circuits inputs a record to a corresponding one of the memories C–E. Also, the $F_1$ logic circuit resets the flip-flop Z when a Z blank is introduced to the memory A, so that the logic circuit $C_1$ will not distinguish a Z blank. The $A_1$–$A_5$ logic circuits will set the corresponding "line full" flip-flops $D_1$–$D_5$ whenever their corresponding lines output records. At the same time, the "part full" flip-flop P.F. is reset since when a particular memory first produces a record output, there are no partially full memories in the system. However, the next time a partially full flip-flop $N_3$–$N_5$ is set, the partially full flip-flop P.F. is again set. The logic circuits $F_3$–$F_5$ set the corresponding partially full flip-flops $N_3$–$N_5$ whenever a record is inputed to a corresponding memory ($L_3'$, $L_4'$ or $L_5'$; FIGURE 18).

During the first phase of the sort mode, the flip-flop S.M. (FIGURE 16) is set, and the flip-flop S is reset. Then, during the second phase, the flip-flop S is set. It will be remembered that during phase I and phase II, the records from the least memory A are distinguished. This is achieved by assuring that the $t_2$ bit is 1 (FIGURE 15), and it is accomplished by the "and" gate 504 in the logic circuit $C_1$ of FIGURE 20.

Phase I of the sort mode continues until a distinguished record appears in the least memory A. Then the sort phase flip-flop S (FIGURE 16) is set and the system enters phase II.

The flip-flop T is reset during phase I of the sort mode by the first record out of the least memory A. This resetting is achieved by the terms $\overline{L_1}$ and $t_2$ applied to the "and" gate 322 in FIGURE 17. The flip-flop T is then set at the end of phase I, by the first distinguished record D* out of the least memory A. The setting is achieved by the terms $L_1'$ and $t_2$ applied to the "and" gate 320 of FIGURE 17. The flip-flop T is then reset during the second word time of the phase II by the undistinguished record then outputed by the least memory A.

The logic circuits $A_1$–$A_5$ remove the (*) from the records output from the memories A–E during the second phase II of the sort mode, that is, when the flip-flop S is set. This is accomplished, for example, by the "and" gates 474, 438 and 424 in FIGURE 19. However, and as mentioned above, these circuits do not affect the outputs from the memories during phase I, when the flip-flop S is false. The latter circulation is carried on through the "and" gates 476, 440 and 426 in FIGURE 19.

When the "first record" flip-flop T is set at the beginning of phase II, the "and" gate 508 in the logic circuit $C_1$ of FIGURE 20 which causes the $t_3$ bit of the D* output to become 0, so that a D+ record is formed (FIGURE 15). The flip-flop T is then reset, and thereafter, the logic circuit appends an (*) to the records, by way of the "and" gate 506. The "and" gate 504 assures that the $t_2$ bit will always be 1, so that the record must be either D+ or D* (FIGURE 15).

The logic circuits $A_1$–$A_5$ detect whenever the first record D+ is output from any of the memories A–E to return the sort mode to phase I. This is achieved by resetting the flip-flop S (FIGURE 16) whenever an ouput $L_1$ exhibits a zero bit at $t_3$ bit time. At this time, the logic circuits $B_1$–$B_5$ restore the particular D+ record to a D or D* form. This latter function is achieved by the "and" gates 464 and 454 of the logic circuits $B_1$ and $B_3$ in FIGURE 19; and by the "and" gate 494 in the logic circuit $B_1$ of FIGURE 20.

The logic circuits $C_2$–$C_5$ perform no function during the sort mode.

The exchange flip-flop R of FIGURE 17 is set at the beginning of phase II of the sort mode, by the term $L_1 \cdot t_2$ when the distinguished record is outputed from the least memory A. Then, if there are any exchanges in any of the sorters $S_1$, $S_0$–$S_5$, $S_1'$–$S_5'$ (indicating that a sorted condition has not been achieved), the flip-flop R is reset during phase II. However, if there are no exchanges, indicating that the sort is complete, the flip-flop R remains set at the end of phase II. The sort complete flip-flop S.C. (FIGURE 17) is then set. The latter flip-flop remains set until the output mode is initiated.

When the sort complete flip-flop (S.C.) is set, the logic circuits $A_1$–$A_5$ return the first (least) record out of each memory to the D form. This is achieved, for example, by the "and" gates 478, 442 and 428 in FIGURE 19. The output mode flip-flop O.M. of FIGURE 16 may now be set to initiate the output mode.

The output mode flip-flop O.M. of FIGURE 16 is set to cause the system to enter the output mode. It will be remembered that during the output mode, whenever the least record in a memory A–E is outputed from that memory, its distinction (*) is removed. This is achieved by the logic circuits $A_1$–$A_6$ of FIGURE 19.

The flip-flops $D_1$–$D_5$ of FIGURE 18 are first reset during the output mode when the least record (now undistinguished as mentioned above) is outputed from the different memories. Whenever one of the $D_1$–$D_5$ flip-flops is reset, the (*) is removed from the next record outputed from the line. This is achieved by the "and" gates 482, 446 and 432 in FIGURE 19.

Subsequently and when a B blank is outputed from any particular memory during the output mode, indicating that that memory is empty, the corresponding $N_1$ flip-flop is reset. This is achieved by the "and" gates 372, 374 and 376 in FIGURE 18.

The circuits $B_1$–$B_5$, on the other hand, replace the (*) to the record if an exchange was made in the corresponding sorter and the corresponding memory was not empty ($N_1$ set). This is achieved, for example, by the "and" gate 498 in FIGURE 20, and by the "and" gates 468 and 453 in FIGURE 19.

If the record outputed from any memory during the output mode is distinguished, or is a B or B* blank, the next lower sorter of the sorter $S_0$–$S_5$ is inhibited so that the record will be returned to the same line. This is achieved, for example, by the inhibit circuits including the "and" gates 490 of FIGURE 20, and the "and" gates 460, 450, 448 of FIGURE 19.

If the output from any memory during the output mode is an undistinguished (D) record, or a distinguished record (D*) the corresponding sorter of the sorters $S_1'$–$S_5'$ is inhibited. This is accomplished, for example, by the "and" gates 510, 512 and 514 in the logic circuits $C_1$, $C_2$ and $C_3$ of FIGURE 20.

The logic circuits $F_1$–$F_5$ function during the output mode to restore the distinction (*) to any record or blank outputed from a memory for which the $D_1$ flip-flop is set; indicating that an undistinguished record has been inputed to the corresponding memory. This is achieved by the "and" gates 522, 528 and 534 in FIGURE 20. Also, the distinction (*) is restored during the output mode when the corresponding $D_1$ flip-flop is reset and the corresponding $N_1$ flip-flop is set, and an exchange ($E_1'$) was made in the corresponding sorter $S_1'$–$S_5'$. This latter operation is carried out, for example, in the "and" gates 524, 530 and 536 of FIGURE 20.

In the manner described, therefore, the improved sorting system of the invention performs a complete sort to records fed into it.

As described, the system is advantageous since it permits interruptions to occur during the input or output modes. Also, it permits new records to be fed into the system while a previous sorted set is being outputed. By the same token, a non-destruct output can be achieved whereby a counterpart of each outputed record is retained in the system.

By a simple modification, the R flip-flop can be controlled to terminate the sort after a partial sort has been achieved. This is advantageous where time is of the essence and it is not too important for the records all to be completely sorted right down to the least record.

In order further to explain the operation of the system, the following appendix should prove to be helpful.

APPENDIX (1) Terms associated with the logic circuits $A_1$–$A_5$ (collectively termed $A_1$):

$$A_1=\cdot\overline{N_1}\cdot\overline{D_1}\cdot B^{**}+IM\cdot\overline{t_2}\cdot N_1\cdot L_1+SM\cdot S\cdot D_1\cdot L_1\cdot\overline{t_2}$$
$$+SM\cdot\overline{S}\cdot D_1\cdot L_1+SM\cdot SC\cdot\overline{t_2}\cdot L_1+OM\cdot L_1\cdot D_1$$
$$+OM\cdot N_1\cdot\overline{D_1}\cdot\overline{t_2}\cdot L_1+SM\cdot S\cdot D_1\cdot L_1\ (L_1\cdot t_3)x$$
$$+OM\cdot N_1\cdot L_1\cdot\overline{D_1}\ (\overline{L_1}\cdot t_3)^x$$

$x$=Sample ahead of reclocking flip-flop ${}_1D_1,\ {}_0PF=\overline{OM}\cdot t_1\cdot\overline{L_1}\cdot N_1$ ${}_0S=SM\ (L_1\cdot t_2)(\overline{L_1}\cdot\overline{t_3})^x$ ${}_1S=SM\cdot L_1\cdot\overline{t_2}$ (from $F_1$)

$SM\cdot S\cdot D_1\cdot L_1\cdot\overline{t_2}$=In Phase II of the Sort Mode, the outputs of all memories which have been filled with data will have their distinctions removed by $A_1$.

$SM\cdot\overline{S}\cdot D_1\cdot L_1$=In Phase I of the Sort Mode, the outputs of all memories which have been filled with data will pass through $A_1$ unchanged.

$SM\cdot SC\cdot\overline{t_2}\cdot L_1$=Remove distinctions from data outputs for one record time only; then SC and SM are reset and OM is set.

${}_1SC=L_1t_2+\overline{S}\cdot\overline{R}$ from $F_1$ $SC\cdot L_1\cdot t_2={}_0SM,\ {}_1OM$ from $A_1$ ${}_0SC=t_3\cdot SM$ from $B_1$ $SM\cdot S\cdot D_1\cdot L_1(\overline{L_1}t_3)^x$=Prevents distinction ($t_2$ bit from being removed if D° enters $L_1$ (otherwise D° would then look like a Z and get sorted down).

$OM\cdot L_1\cdot D_1$=In the Output Mode, data is allowed to pass through $A_1$ unchanged if there is an undistinguished data record in $L_1$.

$OM\cdot N_1\cdot L_1\cdot\overline{D_1}\cdot\overline{t_2}$=In the Output Mode a $t_2$ bit is removed from the outputs of those memories which contain distinguished data ($N_1\cdot\overline{D_1}$= distinguished data).

${}_0N_1+{}_1D_1=OM\cdot\overline{D_1}(L_1\cdot t_2)(\overline{L_1}\cdot t_3)^x$ $OM\cdot N_1\cdot L_1\cdot\overline{D_1}(\overline{L_1}\cdot t_3)^x$=Prevents $t_2$ bit from being removed when B blank enters $L_1$ (otherwise the first B blank into the memory would then look like a Z blank and get sorted down).

$IM\cdot L_1\cdot N_1\cdot\overline{t_2}$=During the Input Mode, distinctions are removed from the outputs of all the memories which contain data.

$\overline{N_1}\cdot\overline{D_1}\cdot B^{}$=In any mode B blanks are generated by $A_1$ for the outputs of all the memories which do not contain data since the start of the Input Mode.

$(IM+SM)\overline{L_1}\cdot N_1\cdot t_1={}_1D_1+{}_0PF$

In the Input Mode and Sort Mode, if the output of a memory which contains either data or Z blanks ($N_1=1$) shows a zero at $t_1$ time, $D_1$ is set and PF is reset, indicating that the memory is full (i.e. no more B** blanks in the memory). The latter equation may be reduced to $$\overline{OM}\cdot\overline{L_1}\cdot N_1\cdot t_1={}_1D_1+{}_0PF$$

since one of the mode indicators must always be true.

$$SM\cdot L_1\cdot t_2(\overline{L_1}\cdot t_3)^x={}_0S$$

In the Sort Mode, if a memory output contains a D° (i.e. $t_2=1$ and $t_3=0$), S is reset, thus indicating the end of Phase II.

$$OM\cdot\overline{D_1}\cdot L_1\cdot t_2(\overline{L_1}\cdot t_3)^x={}_0N_1+{}_1D_1$$

In the Output Mode, a memory which contains no undistinguished data.

$$OM\cdot\overline{L_1}\cdot t_2={}_0D_1$$

In the Input Mode, when D is removed from the output of $L_1$, the memory contains no more D (only D* or B). (In $F_1$, once a D is detected going into $L_1$, $t_2$ bits are added until $D_1$ is again reset by $A_1$).

(2) Terms associated with the logic circuit $B_1$–$B_5$ (collectively $B_1$):

$$B_1=IM\cdot L_1+SM(L_1+t_3)+OM(L_1+E_1\cdot N_1\cdot t_2)$$
$$=IM\cdot L_1+SM\cdot L_1+SM\cdot t_3+OM\cdot L_1+OM\cdot E_1\cdot N_1\cdot t_2$$

i.e., $$B_1=L_1+SM\cdot t_3+OM\cdot E_1\cdot N_1\cdot t_2$$

$L_1$=Allows data to pass through the logic circuits in any mode without removing bits.

$SM\cdot t_3$=Adds a bit at $t_3$ bit time in the Sort Mode (in particular, changes D° to D* since B blanks and Z blanks are not used in the Sort Mode).

$OM\cdot E_1\cdot N_1\cdot t_2$=In the Output Mode, adds a bit at $t_2$ bit time to memories which contain data, if an exchange was made.

$$OM\cdot L_1\cdot t_2={}_{\text{INHIBIT}}S_{1-1}$$

Inhibits the following sort unit in the Output Mode, if distinguished data enters $B_1$. (All types of B blanks also inhibit the sort unit.)

(3) Terms associated with the logic circuits $C_1$–$C_5$ (collectively termed $C_1$):

$C_1=L_1$ ($C_1$ does not alter the data transmission)

$OM\cdot\overline{E_1}\cdot L_1\cdot t_3={}_{\text{INHIBIT}}S_1'$

In the Output Mode, $C_1$ detects a distinguished data input. If $S_1'$ did not exchange at $t_2$ time ($E_1'=0$) it is inhibited by $C_1$ at $t_3$ time.

(4) Terms associated with the logic circuits $F_1$–$F_5$ (collectively termed $F_1$):

$$F_1=(IM+SM)L_1+OM(L_1+D_1t_2)+OM\cdot E_1'\cdot N_1\cdot t_2$$
$$=L_1+OM\cdot D_1\cdot t_2+OM\cdot E_1'\cdot N_1\cdot t_2$$

$L_1$=Allows data to pass through any mode without removing bits.

$OM\cdot D_1\cdot t_2$=In the Output mode, adds a distinction ($t_2$ bit) to the inputs of memories which contain undistinguished data (i.e. the smallest record in $L_1$ has no distinction).

$OM\cdot E_1'\cdot N_1\cdot t_2$=In the Output Mode, a distinction is added if the smallest record which was in $L_1$ has been exchanged for a blank and has thus been transmitted to a shorter memory.

$IM\cdot\overline{L_1}\cdot t_1={}_1N_1$

In the Input Mode, the presence of a zero bit at $t_1$ time indicates that either data or a Z blank is being put into a line (B** were put in previously).

$$OM\cdot N_1\cdot\overline{L_1}\cdot t_2={}_1D_1$$

In the Output Mode, if $L_1$ contains data and has a zero bit at $t_2$ time, $D_1$ is set indicating undistinguished data is put into $L_1$.

$$N_1\cdot\overline{D_1}\cdot t_2={}_1PF$$

The PF flip-flop can be set in any mode if any memory contains a distinguished data ($N_1=1$ means data, $t_2=1$ restricts the data to distinguished data), but is not full of data ($D_1=1$ if $L_1$ has been filled with data).

The system is also susceptible to simple modifications to perform a wide variety of sorting and other operations.

Therefore, while a particular embodiment of the invention has been shown and described, modifications may be made. It is intended to cover all such modifications in the appended claims.

What is claimed is:

1. A system for sorting multi-bit binary records into a desired sequence, each record containing a control field, an identifying field, and a data field, and said sorting system including: a sorting network having a plurality of input and output terminals and responding to said identifying and control fields of the multi-bit binary records applied to its input terminals to cause said records to appear in a desired order at its output terminals; a first plurality of sorting units each having a pair of input terminals and a pair of output terminals and each responding to the control and identifying fields of the multi-bit binary records applied to its input terminals to process such records and cause the record with the higher control and identifying fields to appear at one of its output terminals and the other to appear at its other output terminal, one of said output terminals of each of said sorting units of said first plurality being connected to corresponding input terminals of said sorting network; a second plurality of sorting units each hava pair of input terminals and a pair of output terminals and each responding to the control and identifying fields of the multi-bit binary records applied to its input terminals to process such records and cause the record with the higher control and identifying fields to appear at one of its output terminals and the other to appear at its other output terminal, one of said input terminals of each of said sorting units of said second plurality being connected to corresponding output terminals of said sorting network; a plurality of memories having respective capacities to store different numbers of said records in a predetermined progression and each having an input terminal and an output terminal; a first plurality of logic circuits intercoupling the output terminals of respective ones of said memories and one of the input terminals of corresponding ones of said sorting units of said first plurality to establish different control field designations in said records; a second plurality of logic circuits intercoupling one of the output terminals of respective ones of said sorting units of said second plurality and the input terminals of corresponding ones of said memories to establish different control field designations in said records; a first means intercoupling the other output terminal of respective ones of said sorting units of said first plurality with the other input terminal of others of said sorting units of said first plurality; second means intercoupling the other output terminal of respective ones of said sorting units of said second plurality with the other input terminal of others of said sorting units of said second plurality; so as to provide a circulating path for multi-bit binary records fed into the system and to selectively cause the binary bit designations in the control fields of said records to be selectively changed and thereby to control the circulation of such records through the system.

2. The system defined in claim 1 in which said first means includes a third plurality of logic circuits intercoupling respective ones of said sorting units of said first plurality to establish different control field designations in the binary records circulated therethrough, and said second means includes a fourth plurality of logic circuits intercoupling respective ones of said sorting units of said second plurality to establish different control field designations in the multi-bit binary records circulated therethrough.

3. The system defined in claim 1 in which two of said memories each has a capacity to store one of said records only, and the others of said memories have respective capacities to store different numbers of said records in a predetermined progression of $2^1$, $2^2$, $2^3$, $2^4$ . . . $2^n$.

References Cited

UNITED STATES PATENTS

| | | | |
|---|---|---|---|
| 2,951,234 | 8/1960 | Spielberg et al. | 340—172.5 |
| 3,013,249 | 12/1961 | Armstrong | 340—172.5 |
| 3,015,089 | 12/1961 | Armstrong | 340—172.5 |
| 3,029,413 | 4/1962 | O'Connor et al. | 340—172.5 |
| 3,311,892 | 3/1967 | O'Connor et al. | 340—172.5 |

ROBERT C. BAILEY, *Primary Examiner.*

J. P. VANDENBURG, *Assistant Examiner.*